US009764669B2

(12) United States Patent
Lamesch

(10) Patent No.: US 9,764,669 B2
(45) Date of Patent: Sep. 19, 2017

(54) SEAT HEATER USABLE AS ANTENNA ELECTRODE

(75) Inventor: Laurent Lamesch, Lamadelaine (LU)

(73) Assignee: IEE International Electronics & Engineering S.A., Echternach (LU)

( * ) Notice: Subject to any disclaimer, the term of this patent is extended or adjusted under 35 U.S.C. 154(b) by 1105 days.

(21) Appl. No.: 13/994,817

(22) PCT Filed: Dec. 7, 2011

(86) PCT No.: PCT/EP2011/072135
§ 371 (c)(1),
(2), (4) Date: Jun. 17, 2013

(87) PCT Pub. No.: WO2012/080066
PCT Pub. Date: Jun. 21, 2012

(65) Prior Publication Data
US 2013/0270874 A1 Oct. 17, 2013

(30) Foreign Application Priority Data
Dec. 17, 2010 (LU) ........................... 91 768

(51) Int. Cl.
*B60N 2/56* (2006.01)
*B60N 2/00* (2006.01)
*B60R 21/015* (2006.01)

(52) U.S. Cl.
CPC .......... *B60N 2/5685* (2013.01); *B60N 2/002* (2013.01); *B60R 21/01532* (2014.10)

(58) Field of Classification Search
CPC .. B60N 2/002; B60N 2/5685; B60R 21/01532
(Continued)

(56) References Cited

U.S. PATENT DOCUMENTS 6,161,070 A 12/2000 Jinno et al.
6,392,542 B1 5/2002 Stanley
(Continued)

FOREIGN PATENT DOCUMENTS

DE 4338285 A1 5/1995
EP 2325060 A2 5/2011
(Continued)

OTHER PUBLICATIONS

International Search Report for corresponding application PCT/EP2011/072135 filed Dec. 7, 2011; Mail Date Mar. 29, 2012.
(Continued)

*Primary Examiner* — Dana Ross
*Assistant Examiner* — Kuangyue Chen
(74) *Attorney, Agent, or Firm* — Reising Ethington P.C.

(57) ABSTRACT

A seat heater, e.g. for a vehicle seat, comprises a heating element (10) for dissipating heat when a heating current flows across it and a temperature sensor (15) for providing a temperature signal indicative of the seat temperature. The seat heater comprises a common mode choke (16) with at least three windings. The heating element is connected in series between a first (16.1) and a second (16.2) thereof so as to be operatively connectable to a power source (12) via the common mode choke. The temperature sensor is connected to a third winding (16.3) of the at least three windings in such a way that the temperature signal may be received, e.g. by a temperature controller of the seat heater, via the third winding of the common mode choke.

17 Claims, 14 Drawing Sheets

(58) Field of Classification Search
USPC .................. 219/202, 504, 50, 5; 297/180.12
See application file for complete search history.

(56) References Cited

U.S. PATENT DOCUMENTS

| | | |
|---|---|---|
| 6,703,845 B2 | 3/2004 | Stanley et al. |
| 7,521,940 B2 | 4/2009 | Koch et al. |
| 2001/0045733 A1* | 11/2001 | Stanley .................. B60N 2/002 280/735 |
| 2007/0208529 A1 | 9/2007 | Koch et al. |
| 2008/0080106 A1* | 4/2008 | Mirafzal .................. H02M 1/12 361/42 |
| 2008/0186282 A1* | 8/2008 | Nix .................. B60K 37/00 345/173 |
| 2009/0251194 A1* | 10/2009 | Morong .............. H03F 3/45475 327/333 |
| 2009/0295199 A1 | 12/2009 | Kincaid et al. |

FOREIGN PATENT DOCUMENTS

| | | |
|---|---|---|
| WO | 9217344 A1 | 10/1992 |
| WO | 9513204 A1 | 5/1995 |
| WO | 2008095939 A1 | 8/2008 |

OTHER PUBLICATIONS

J. R. Smith, "Electric Field Sensing for Graphical Interfaces", published in Computer Graphics I/O Devices, Issue May/Jun. 1998, pp. 54-60.

Written Opinion for corresponding application PCT/EP2011/072135 filed Dec. 7, 2011; Mail Date Mar. 29, 2012.

* cited by examiner

SEAT HEATER USABLE AS ANTENNA ELECTRODE

FIELD OF THE INVENTION

The present invention generally relates to a capacitive occupant detection system, e.g. for detecting the absence or presence of an occupant seated on a vehicle seat. More specifically, the invention relates to a combined seat heating and capacitively occupancy sensing device.

BACKGROUND OF THE INVENTION

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10 A DC and more) and present high AC impedance to the capacitive measurement circuit and the seat heater at the same time. High inductance and high operating DC current implies that the inductor have to be wound on large cores, which are expensive. Depending on the application chosen from U.S. Pat. No. 6,703,845, either two or four of these inductors have to be used.

BRIEF SUMMARY

The invention provides for using the heating element of a seat heater as an antenna electrode of a capacitive sensor while reducing negative impact of the presence of a temperature sensor located in proximity of the heating element on the capacitive measurement.

According to the invention, a seat heater, e.g. for a vehicle seat, comprises a heating element for dissipating heat when a heating current flow across it and a temperature sensor for providing a temperature signal indicative of the seat temperature. The seat heater comprises a common mode choke with at least three windings. The heating element is connected in series between a first and a second winding of the at least three windings so as to be operatively connectable to a power source via the common mode choke. The temperature sensor is connected to a third winding of the at least three windings in such a way that the temperature signal may be received, e.g. by a temperature controller of the seat heater, via the (third winding of) the common mode choke.

The present invention uses a common mode choke with a coupling factor close to unity to achieve AC-decoupling of the heating element from its power supply. Using a common mode choke instead of separate inductors reduces the number of components and the costs. The common mode choke produces high impedance against common mode currents from the heating element into the first and second windings and from the temperature sensor into the third winding. Accordingly, the common mode choke substantially prevents alternative current induced in or driven into the heating element and the temperature sensor from flowing to ground via the power supply and/or the temperature controller.

The temperature sensor may e.g. be negative-temperature-coefficient resistive temperature sensor, a positive-temperature-coefficient resistive sensor, a semiconductor temperature sensor, or a temperature sensor with analog and/or digital processing circuitry. The temperature sensor may also be part of an integrated circuit incorporating also a processing circuit that outputs the measured temperature as a digital signal.

As used herein, the term "impedance" designates the modulus (absolute value) of the complex impedance, which is defined as the ratio between (complex) voltage and (complex) current.

In the following, we will assume that the heating current is direct current (DC) and that the capacitive measurement uses alternative current (AC) at a certain frequency. This is insofar a simplification that transient states (e.g. switching on/or off of the heating current), noise and parasitic currents are not taken into account. It should also be noted that the heating current need not be direct current in the strictest sense: it may be variable, but on a long time-scale, so as not to interfere with the current used for the capacitive measurement. For sake of simplicity, we will use "DC" to designate slowly varying or constant signals. The capacitance measurement network preferably operates at frequency selected in the range from about 50 kHz to about 10 GHz, more preferably in the range from about 50 kHz to about 30 MHz.

In the following, the node of the heating element with which it is connected to the first winding will be termed the first node (of the heating element). The node of the heating element with which it is connected to the second winding will be termed the second node (of the heating element). The nodes, which the first and the second winding connects the first and the second node to, will be termed third node and fourth node, respectively. The heating element is preferably an ohmic heating element, i.e. a heating conductor (or resistor), such as e.g. a heating wire, a heating cable, a heating fiber, a bundle of heating fibers, a resistive trace printed on an electrically insulating (preferably flexible) substrate.

According to a preferred embodiment of the invention, the temperature sensor comprises a first and a second terminal, the temperature sensor being connected to the third winding with the first terminal and to the heating element with its second terminal. According to another preferred embodiment of the invention, the temperature sensor comprises a first and a second terminal, wherein the at least three windings include a fourth winding, the temperature sensor being connected to the third winding with the first terminal and to the fourth winding with its second terminal.

Preferably, the seat heater comprises a temperature controller operatively connected to the temperature sensor via the third winding for receiving the temperature signal and to the heating element via the first and/or the second winding for regulating the heating current depending on the temperature signal received.

The seat heater may comprise a support element, such as e.g. an electrically insulating film or textile, having the heating element and the temperature sensor arranged thereon in vicinity of each other.

An aspect of the present invention concerns an assembly (a combination) of a capacitive seat occupancy sensor and a seat heater. The capacitive seat occupancy sensor preferably comprises a capacitive sensing network operatively connected to the heating element to apply an oscillating voltage thereto and to derive a capacitive load of the heating element from a current flowing into the heating element in response to the application of the oscillating voltage. The capacitive occupancy sensor operates in so-called loading mode. The AC component of the current driven into the heating element depends on the impedance (and thus the capacitance) of the heating element to ground.

According to a first variant of the assembly, the capacitive sensing network comprises a means to sustain an oscillating signal in or to drive an oscillating signal into the heating element and a high-impedance amplifier having an input node operatively connected to the heating element to probe the oscillating signal and an output node to provide and output signal indicative of the oscillating signal. Preferably, the capacitive sensing network derives not only the capacitive load of the heating element but also the resistive part of the complex impedance between the heating element and ground. Generally speaking, the output signal of the high-impedance amplifier allows measuring the voltage present on the heating element substantially without disturbing the measurement by its presence. The output voltage of the high-impedance amplifier permits to derive the complex impedance and thus the capacitance between the heating element and ground. As the capacitance between the heating element and ground depends on whether there is or not a conductive body (e.g. an occupant) in proximity of the heating element, the occupancy state of the seat containing the heating element can be derived from the output voltage of the high-impedance amplifier.

In the context of the present, the term "high-impedance amplifier" designates an amplifier, the complex impedance of which has a reactive part that is substantially higher (e.g. at least five times higher) than the reactive part of the complex impedance to be measured and a resistive part that is substantially higher (e.g. at least five times higher) than the resistive part of the complex impedance to be measured.

The capacitive sensing network preferably comprises a reference component having a known complex impedance (e.g. a reference capacitor, a reference inductor and/or a reference resistor) and a switch to operatively connect the reference component between the heating element and ground. The reference component may thus be connected in parallel with the complex impedance to be measured by closing the switch that is connected in series with the reference component. By probing the oscillating signal applied to the heating element when the switch is open and when the switch is closed, it is possible to reduce measurement errors due to production tolerances and drifts due to ageing and/or temperature variations of the circuit components. The reference component is preferably chosen such that its complex impedance remains substantially unaffected by temperature changes and ageing.

The heater network may include a further common mode choke connecting the third and the fourth node to a fifth and a sixth node, respectively, the fifth and sixth nodes being connectable to a power source for the heating network. The means to sustain an oscillating signal in or to drive an oscillating signal into the heating element may then comprise an AC voltage source that is AC-coupled to at least one of the third and fourth nodes. The common mode choke that connects the first and the second node to the third and the fourth node, respectively, thus forms a complex voltage divider with the complex impedance to measured. The high impedance amplifier probes the divided voltage. The complex impedance may thus be derived from the output signal of the high-impedance amplifier as the voltage applied by the AC voltage source and the inductance of the common mode choke are known. If necessary (e.g. if the voltage applied by the AC voltage source is not known a priori), the voltage on the at least one of the third and fourth nodes that the AC voltage source is connected to can be probed with a further high-impedance amplifier. If the inductance is unknown or subject to drift with time and/or temperature, one may use a reference capacitor as mentioned above to compute the complex impedance to be measured without knowledge of the inductance of the common mode choke closest to the heating element.

The heating element preferably has a capacitance to ground, so that (the first and second windings of) the common mode choke forms a parallel resonant network with the capacitance (and possibly with other reactive components). Then, the means to sustain an oscillating signal in or to drive an oscillating signal into the heating element may e.g. comprise
- a negative resistance device (e.g. the "active" or power-supplying part of an oscillator circuit) to sustain the oscillating signal (at the resonance frequency) in the resonant network and to compensate for resistive losses and power extracted from the resonant network, and/or
- an AC source operatively connected to the heating element to drive an alternative current into the resonant network and a frequency control unit for controlling the frequency of the alternative current.

In the first case, the negative resistance device and the resonant network form together an oscillator, the resonance frequency of which depends on the inductance of the common mode choke and on the capacitance to be measured. If the inductance is unknown or subject to drift with time and/or temperature, one may use a reference capacitor as mentioned above and compare the resonance frequency measured when the reference capacitor is switched in parallel to the capacitance to be measured and the resonance frequency measured when the reference capacitor is disabled. Preferably, the capacitive sensing network comprises a feedback branch from the output node of the high-impedance amplifier to the negative resistance device to regulate the amplitude of the oscillating signal to a reference amplitude.

In the second case, the oscillation of the resonant network is constrained to oscillation at the frequency determined by the frequency control unit. Preferably, the latter frequency is equal to or close to the resonance frequency of the resonant network (preferably within the range from a tenth of to ten times the resonance frequency). The complex impedance to be measured could be obtained from the complex impedance of the resonant network, which is given by the ratio of the complex voltage probed by the high-impedance amplifier and the complex current driven into the resonant network by the AC source. Preferably, the frequency control unit is configured to vary the frequency of the alternative current within a frequency window. More preferably, the capacitive sensing network comprises a feedback branch from the output node of the high-impedance amplifier to the frequency control unit to regulate a phase difference of the output signal and the alternative current to a reference phase difference value. The reference phase difference value is preferably set to 0°, so that the feedback branch in fact regulates the frequency control unit to the resonance frequency of the resonant network.

According to a second variant of the assembly of a seat heater and a capacitive occupancy sensor, the capacitive sensing network comprises an oscillator which is AC-coupled to at least one of the third and fourth nodes to drive the oscillating voltage into the at least one of the third and fourth nodes as well as a transimpedance amplifier having a first input AC-coupled to the at least one of the third and fourth nodes to receive the oscillating voltage as an AC component of a reference voltage, a second input operatively connected to at least one of the first and second nodes, the transimpedance amplifier being configured to maintain a voltage on the second input node equal (within a certain tolerance range) to the reference voltage by driving a current into the second input, the transimpedance amplifier having an output to provide a signal indicative at least of an AC component of the current driven into the second input.

Preferably, the second input of the transimpedance amplifier is AC-coupled to the at least one of the first and second nodes with a coupling capacitor. Such coupling capacitor prevents direct current from flowing into the transimpedance amplifier.

The capacitive sensing network may advantageously comprise a compensating network configured to compensate a DC voltage drop between the first and second input of the transimpedance amplifier. Preferably, the compensating network comprises a feedback loop configured to add a compensating voltage to the oscillating voltage to produce the reference voltage. Such feedback loop may e.g. comprise an error amplifier and a summing network, the summing network being connected between the at least one of the third and fourth nodes, the error amplifier and the first input of the transimpedance amplifier, the error amplifier being configured to output the compensating voltage when there is a DC voltage drop between the first and second input of the transimpedance amplifier, and the summing network being configured to add the compensating voltage to the oscillating voltage to produce the reference voltage. The error amplifier could e.g. comprise an integrator. The summing network may e.g. comprise a voltage-controlled current source. A distinction is sometimes made between a current source and current sink. The former term then designates a device having a positive current flowing out of it, whereas "current sink" designates a device having a positive current flowing into it (or, likewise, a negative current flowing out of it). It the context of the present, taking into account that current is generally considered an algebraic quantity that can be positive and negative, we use the term "current source" concomitantly to designate both a "current source" or a "current sink".

With both the first and the second variant of the assembly of a seat heater and a capacitive occupancy sensor, the heater network may include a further common mode choke with at least three windings. At least two of these windings connect the third and the fourth node to a fifth and a sixth node, respectively, the fifth and sixth nodes being connectable to a power source for the heating network; at least one of the at least three windings is connected to the third winding of the first common mode choke. The common mode chokes are preferably of the same type.

A preferred aspect of the present invention concerns a vehicle seat equipped with an assembly of a seat heater and a capacitive occupancy sensor.

Preferably, the assembly of a seat heater and a capacitive occupancy sensor comprises a driven shield electrode. As used herein, term driven shield electrode designates an antenna electrode, which is kept at substantially the same AC potential as the heating element. As a consequence, the oscillating electric field substantially cancels between the driven shield electrode and the heating element. It follows that a driven shield electrode substantially prevents the heating element from capacitively coupling to objects, which, as seen from the heating element, lie behind the driven shield electrode. One or more driven shield electrodes may be used to focus the sensitivity of the heating element towards a region of interest, e.g. the part of space above a vehicle seat that is occupied by a normally seated occupant. To keep the driven shield electrode the same AC potential as the heating element, the driven shield electrode is preferably operatively connected to the one of the third and fourth nodes, which the oscillator is operatively connected to.

Yet another aspect of the present invention concerns a capacitive sensing network configured to apply an oscillating voltage to an antenna electrode and to derive a capacitive load of the antenna electrode from a current flowing into the antenna electrode in response to the application of the oscillating voltage, the capacitive sensing network comprising an interface for connecting the capacitive sensing network to a seat heater including a heating element for dissipating heat when a heating current is caused to flow across the heating element and a temperature sensor for providing a temperature signal, the interface being configured for operating the heating element as the antenna electrode. The interface comprises a common mode choke including a first winding for connecting a first node of the heating element to a first terminal of a power supply, a second winding for connecting a second node of the heating element to a second terminal of the power supply and a third winding for connecting the temperature sensor to a temperature controller.

A capacitive sensing network according to this aspect of the invention may be used in combination with seat heaters known as such. This will be highly appreciated by the automotive industry, since it may be possible to use the same type of seat heater both in a configuration without capacitive occupancy sensing ability and in a configuration with capacitive occupancy sensing ability. In a vehicle seat without occupancy sensor, the seat heater may be directly plugged to the seat heater ECU including the power supply and the temperature controller, whereas in a vehicle seat with an occupancy sensor, the capacitive sensing network as described above may be connected between the seat heater ECU and the heating element as well as the temperature sensor.

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

FIGS. 1 to 8 relate to embodiments of a combined seat heater and capacitive occupancy sensor, wherein the capacitive sensing network comprises a high-impedance amplifier. FIGS. 9 to 14 related to embodiments of a combined seat heater and capacitive occupancy sensor, wherein the capacitive sensing network comprises a transimpedance amplifier.

Figure 1:
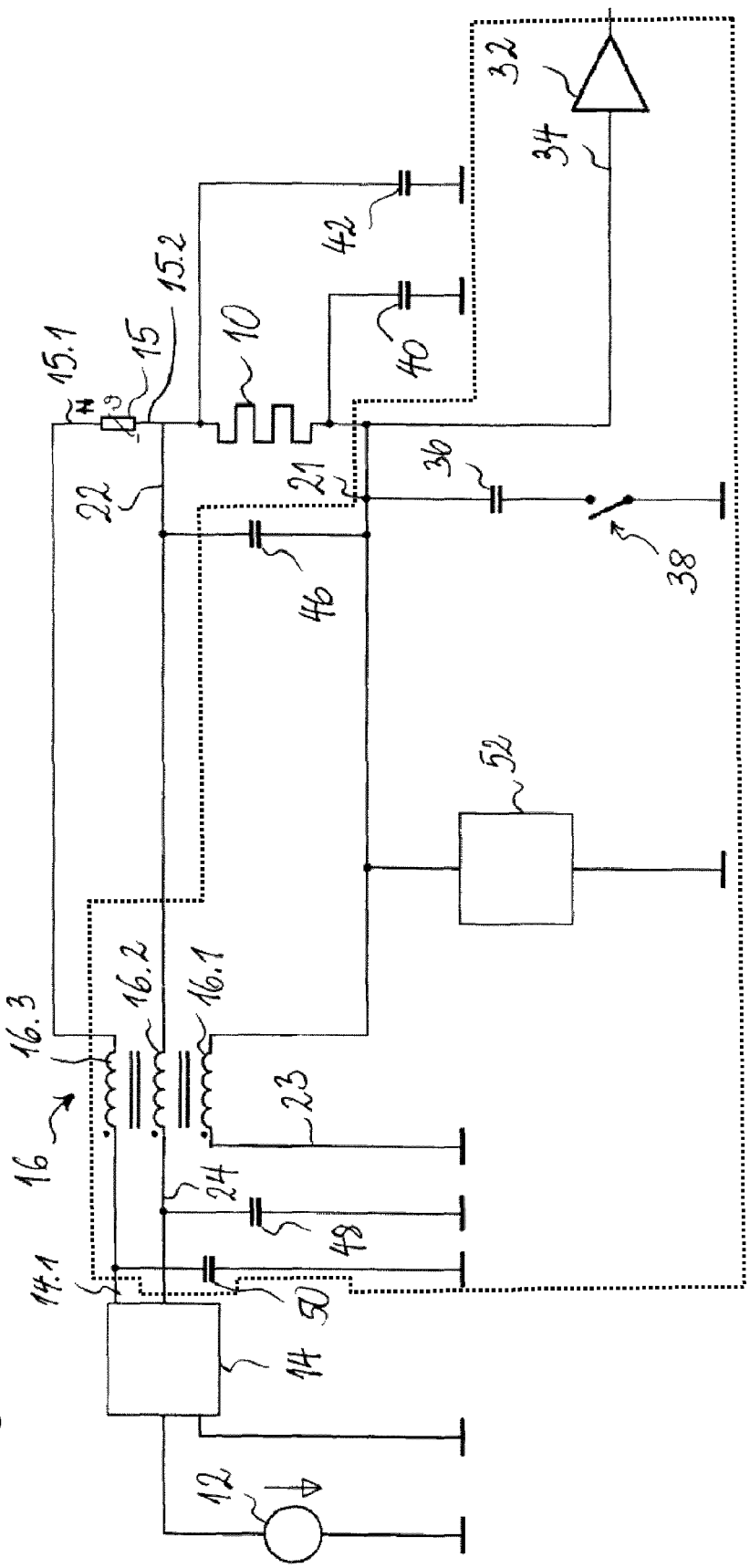
FIG. 1 is a schematic circuit diagram of a first embodiment of a seat heater and capacitive occupancy sensor assembly using a high-impedance amplifier.

FIG. 1 shows a block schematic diagram of a combined seat heater and capacitive occupancy sensor according to a first embodiment. The seat heater comprises a heating element 10, which is used by the capacitive occupancy sensor as an antenna electrode that capacitively couples to ground. The strength of the capacitive coupling between the heating element 10 and ground depends on whether an occupant is present in the zone between the heating element 10 and the grounded counter-electrode. In a loading-mode capacitive occupancy sensor for a vehicle seat, the grounded counter-electrode normally corresponds to the vehicle chassis.

Turning first to the seat heater, the heater network includes power source 12 supplying the required DC heating current to the heating element 10 to perform the heating function. The heater network comprises temperature controller 14, which turns the DC heating current on and off, depending on the actual and required temperature of the seat heater.

The heating element 10 is connected between a first 21 and a second 22 node. When there a potential difference is applied by the power supply between the first and the second nodes 21, 22, the heating current flows across the heating element 10, which is thus caused to dissipate heat. The heating element 10 is operatively connected to the power source 12 with a common mode choke 16 that includes three windings. A first 16.1 and a second 16.2 winding thereof connects the first 21 and the second 22 node to a third 23 and a fourth 24 node, respectively. In FIG. 1, the third node 23 corresponds to ground, whereas the fourth node 24 is operatively connected to the high potential terminal of the power source 12 via the temperature controller 14. The common mode choke 16 exhibits low impedance to DC but substantial impedance to AC at the operating frequency of the capacitive occupancy sensor.

The temperature controller 14 is operatively connected with a temperature sensor 15, which is arranged in vicinity of the heating element 10. The third winding 16.3 of the common mode choke 16 connects the first terminal 15.1 of the temperature sensor to the temperature controller 14. The second terminal 15.2 of the temperature sensor is connected to the second node 22 of the heating element 10. The temperature sensor shown in FIG. 1 is a negative-temperature-coefficient resistive temperature sensor, but other temperature sensors could be used instead, such as, e.g. a positive-temperature-coefficient resistive temperature sensor, a semiconductor temperature sensor, or a temperature sensor with analog and/or digital processing circuitry, etc.

The temperature controller 14 may comprise a user-actuatable master switch (not shown) allowing the user to activate or deactivate the seat heater as a whole and control electronics (including e.g. a thermostat) that regulate the temperature to ascertain comfortable seating. When the seat heater is operating, the temperature controller 14 opens and closes the heating circuit (pulse-width modulation of the heating current) in such a way as to achieve a preset target temperature. Preferably, the target temperature may be selected by the user using a temperature control interface (e.g. a knob, a slider, a wheel or the like). The master switch and the temperature control interface are preferably integrated in the same control element.

When the seat heater is supplied with DC heating current (i.e. when temperature controller 14 closes the heating circuit), current flows from power source 12 though the controller 14, the node 24 herein designated as fourth node, the second winding 16.2 of common mode choke 16, the node 22 herein designated as second node, the heating element 10, the node 21 herein designated as first node, the first winding 16.1 of common mode choke 16, the node 23 herein designated as the third node, which is tied to ground potential. The heating circuit is closed via the ground connection between the third node 23 and power source 12.

The capacitive sensing network (indicated in FIG. 1 by the dotted line) comprises a high-impedance amplifier 32, the input node 34 of which is connected to the heating element 10 at the first node 21, a reference capacitor 36, which is connected between the first node 21 and ground in series with a switch 38, and an active component (in this case the negative resistance device 52) operatively connected to the heating element 10 at the first node 21.

Capacitors 40 and 42 symbolically represent the capacitive coupling of the heating element 10 to a grounded electrode (typically the vehicle frame). The capacitance (and hence the impedance) of these capacitors 40, 42 depends on whether the space between the heating element 10 and the grounded electrode is occupied by a conductive body (e.g. an occupant) or not. Capacitances 40 and 42 together define the capacitance or impedance to be measured.

Capacitances 40 and 42 are electrically in parallel to the common mode choke 16 between the heating element 10 and ground. Accordingly, the common mode choke 16 and the capacitance to be measured form a parallel resonant network, possibly together with further reactive components (such as, e.g. one or more capacitors or inductances), the resonance frequency of which depends on the capacitance to be measured. The further reactive components may be selected in such a way as to shift the resonance frequency into a desired frequency band.

Negative resistance device 52 is preferably the active, oscillation-sustaining part of an oscillator. It sustains an oscillating current in the resonant network by compensating for resistive losses, in such a way that the resonant network operates at or near to its resonance frequency.

The high input impedance amplifier 32 probes the AC voltage on the first node 21 and outputs a corresponding output signal on output node 44, which may then be processed further to derive the capacitance to be measured.

The complex impedance to be measured (and thus the capacitance to be measured) may be determined based on the frequency and the amplitude of the output signal, together with the known complex impedance of the common mode choke 16.

The capacitive sensing network shown in FIG. 1 further comprises a coupling capacitor 46, which represents an AC shunt of the heating element 10. The impedance of capacitor 46 is chosen substantially smaller than the impedance of the total capacitance to be measured. In the absence of capacitor 46, an interruption (break) of the heating element 10 would result in a substantially smaller antenna electrode: this, in turn, would reduce the measurable capacitance. For instance, if heating element 10 shown in FIG. 1 broke in the middle, the measurement circuit would measure capacitance 40 (but not capacitance 42). Coupling capacitor 46 achieves an AC short between the first and second nodes 21, 22, i.e. the terminals of the heating element 10. If a (single) break occurs in heating element 10, then the capacitive sensing network remains substantially unaffected and still measures the total capacitance between the heating element 10 and ground due to the AC shunt provided by capacitor 46.

Coupling capacitors 48 and 50 provide AC shorts between the third node 23, the fourth node 24 and the conductor between the temperature controller 14 and the third winding of the common mode choke. These capacitors 48 and 50 avoid that any AC current is fed into the DC power source 12 and thereby possibly into the car power network.

A problem which may arise when the inductance of a common mode choke is used as inductance of the parallel resonant LC tank together with the capacitance to be measured, is that the drift or temperature dependence or part tolerance of the inductance will lead to a measurement error of the unknown capacitance. The computation of the capacitance to be measured may be may independent on the complex impedance of the common mode choke 16 using the reference capacitor 36.

Reference capacitor 36 has a known capacitance (Cref) and is connected in series with an electronic switch 38 between the first node 21 and ground.

The following procedure may e.g. be executed under control of a microcontroller (not shown) of the capacitive sensing network. A first measurement of the resonance frequency of the parallel resonant LC tank is made with the reference capacitor 36 switched off (switch 38 open). This frequency value is stored (here as fa). A second measurement of the resonance frequency is made with the reference capacitor 36 switched on (switch 38 closed), i.e. connected in parallel to the capacitance to be measured. The so-obtained frequency value is stored (here as fb). The relations between the resonance frequencies and the inductive and capacitive components of the circuit may be expressed through:

$$fa = \frac{1}{2 * \pi * \sqrt{L * Cx}}$$

$$fb = \frac{1}{2 * \pi * \sqrt{L * (Cx + Cref)}}$$

where L is the inductance of the common mode choke, Cx is the capacitance to be measured and Cref is the known capacitance.

The two equations can be combined to yield Cx as a function of the measured frequencies fa and fb:

$$Cx = Cref \times \frac{fb^2}{fa^2 - fb^2}$$

In the latter equation, the inductance L has been eliminated and thus does not influence the capacitance measurement.

It is worthwhile noting again that the third winding 16.3 of the common mode choke is connected between the sensing input 14.1 of the temperature controller 14 and the temperature sensor 15. A property of a common mode choke is that the AC voltages across each of its windings are (substantially) identical. The sensing input 14.1 of the temperature controller is connected to AC ground via the internal impedance of the sensing input 14.1, which is comprised, e.g. in the range from 1 nF to 10 nF in a practical implementation. As the common mode choke behaves so as to maintain the AC voltages across its windings identical, the first terminal 15.1 of the temperature sensor is substantially at the same AC potential as the heating element 10. Therefore, substantially no AC current flows across the temperature sensor 15 during the capacitive measurement. It should be noted that that coupling capacitor 50 is optional if the internal AC impedance to ground of sensing input 14.1 of the temperature controller 14 is sufficiently low.

If the first terminal 15.1 of the temperature sensor 15 were directly tied to the sensing input 14.1 of the temperature controller 14 (without the third winding 16.3 there between), the low impedance of the sensing input 14.1 to AC ground would introduce a non-negligible measurement error into the capacitive measurement. For example, one may choose a capacitance of 1 nF and 10 nF between the sensing input 14.1 and ground in order to suppress the interference of electromagnetic waves on the wires between temperature controller 14 and the heating element 10 as well as the temperature sensor 15. Without winding 16.3, this capacitance and the resistance of the temperature sensor (typically about 10Ω at room temperature) would be in parallel to the capacitance to be measured 40, 42. The resulting impedance would introduce an unacceptably high measurement error into the measurement of capacitance 40, 42. Thanks to the common mode choke 16, the impedance between the temperature sensor 15 and ground (via the internal capacitance of the sensing input 14.1) may be increased to an acceptable level. As a matter of fact, thanks to the common mode choke, the temperature sensor becomes effectively part of the sensing electrode, which increases the sensitivity of the capacitive measurement.

Figure 2:
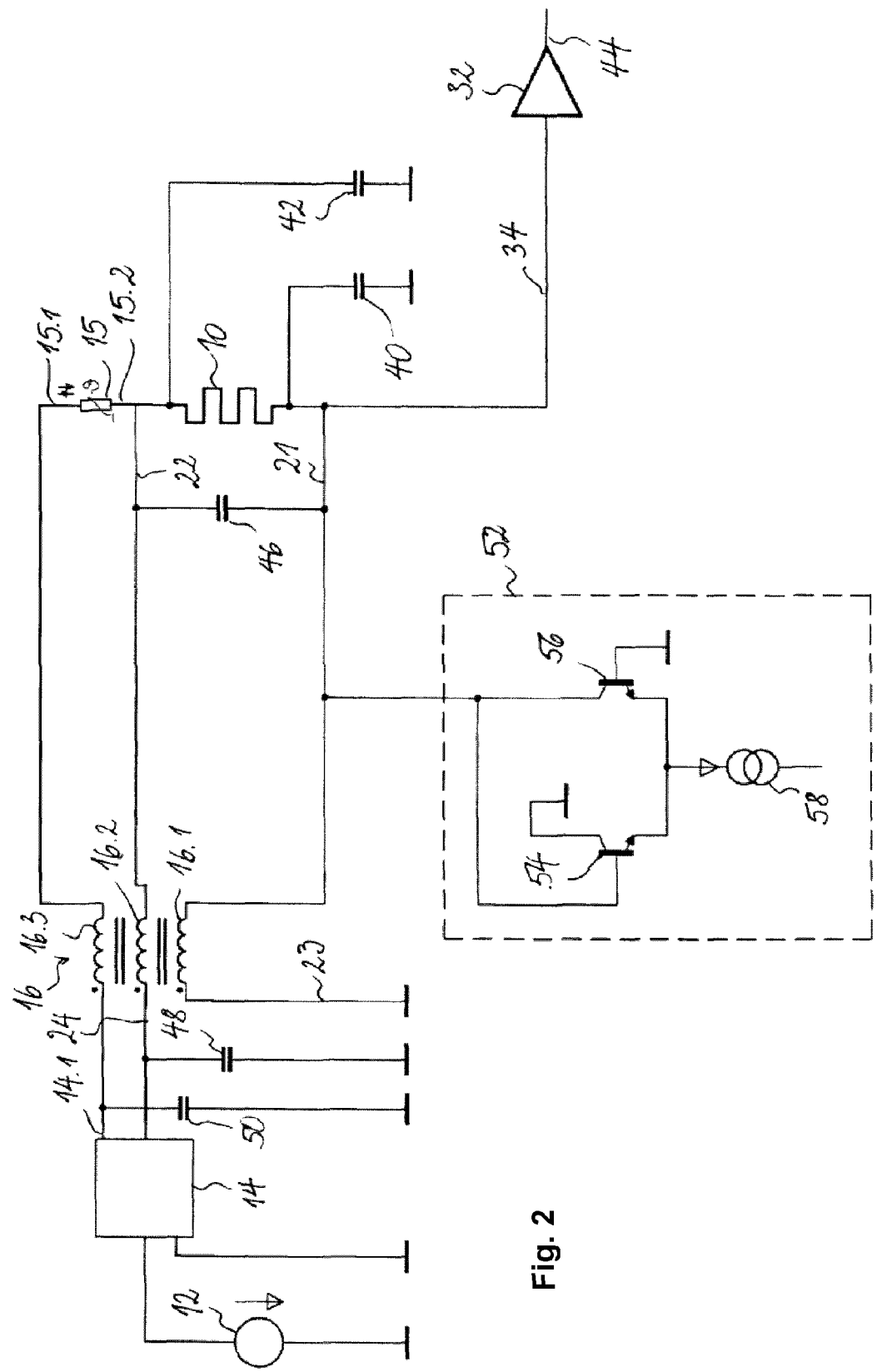
FIG. 2 is a schematic circuit diagram of a first practical implementation of the seat heater and capacitive occupancy sensor assembly of FIG. 1.

FIG. 2 shows a practical implementation of the circuit in FIG. 1. In particular, FIG. 2 illustrates a possible way to implement the negative resistance device 52 of FIG. 1. FIG. 2 thus uses the same reference numbers as FIG. 1 where appropriate. Elements that have already been discussed with reference to FIG. 1 will not be discussed again for sake of conciseness. In FIG. 2, the reference capacitor 36 and switch 38 are not shown. Those skilled will appreciate, however, that such reference capacitor or other reference component could be used in the same manner as discussed with respect to FIG. 1. In any other respect, the implementation shown in FIG. 2 is configured and operates as described with respect to the embodiment of FIG. 1.

The negative resistance device 52 is the active, oscillation-sustaining part of an oscillator. It is the active part of an emitter-coupled LC oscillator and is comprised of transistors 54 and 56 and current sink 58. The circuit is taken from 'Tietze Schenk: Halbleiterschaltungstechnik 12. Auflage', page 878, FIG. 14.10. The same circuit is also implemented as oscillator core in the Motorola MC1648 'Voltage controlled oscillator' integrated circuit. Transistor 54 samples the voltage across the parallel resonating LC tank, and steers the current through transistor 56 via the common emitter connection. Current through transistor 56 is itself fed back via its collector into the parallel resonating LC tank, thereby sustaining the oscillation of the oscillator. Current sink 58 supplies the operating current to the circuit.

The high-impedance amplifier probes the AC voltage on the first node 21 and outputs a corresponding output signal on its output node 44. If the supply current generated by current sink 58 is set to an appropriate value, the amplitude of the AC voltage on node 21 depends essentially only on the resistive component of the resonant network. The capacitance to be measured may then be calculated based on the frequency and amplitude of the output signal of high-impedance amplifier 32 and the known inductance of common mode choke 16. In addition, the resistive part of the complex impedance to be measured can be determined by measuring the amplitude of the output signal on node 44 and/or the DC power drawn by the current source 58 from its power supply.

Figure 3:
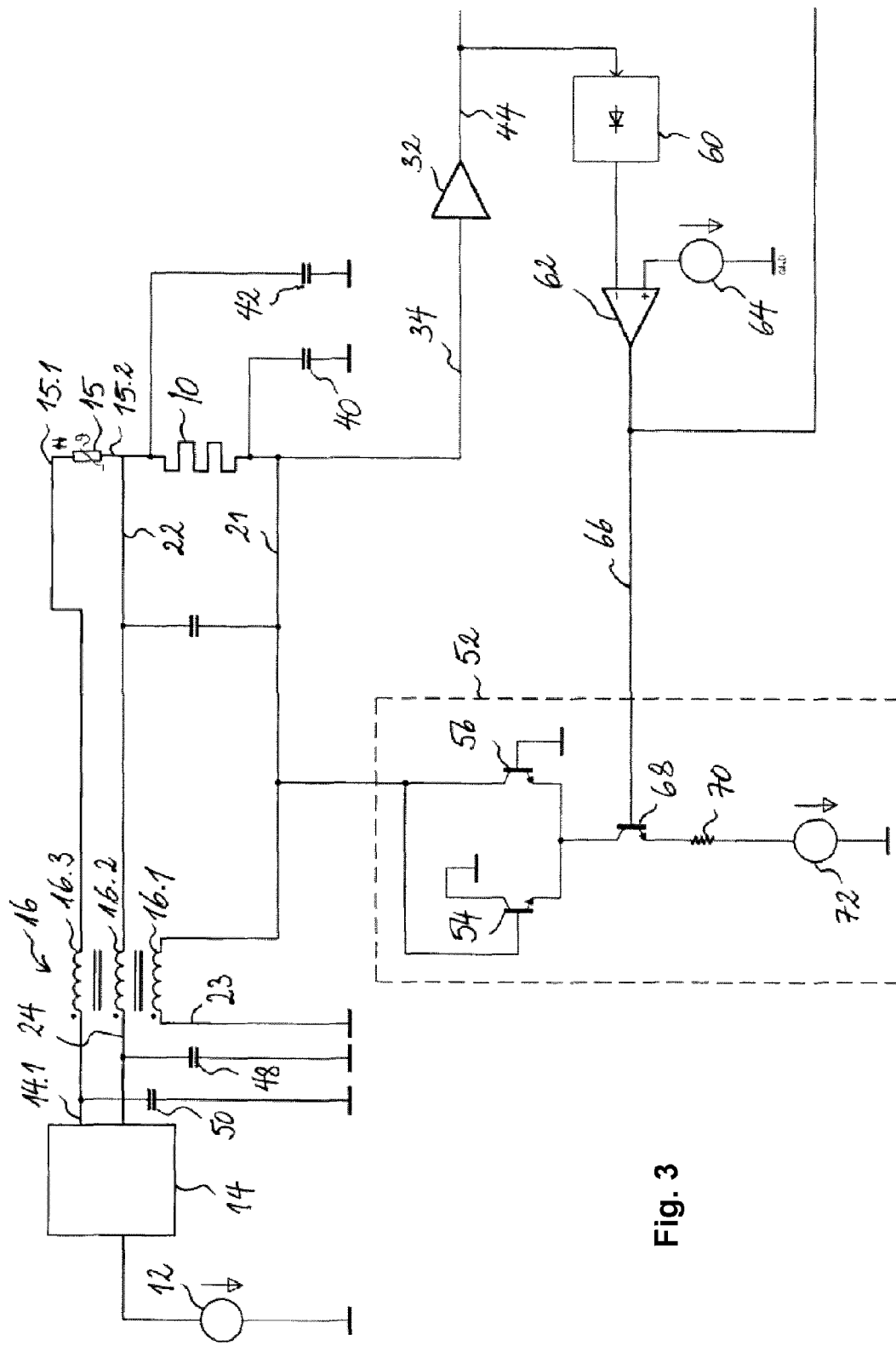
FIG. 3 is a schematic circuit diagram of a second practical implementation of the seat heater and capacitive occupancy sensor assembly of FIG. 1.

According to a further refinement of the implementation of FIG. 2, an 'automatic leveling loop' (e.g. as implemented in the Motorola MC1648 'Voltage controlled oscillator' integrated circuit mentioned above) is added to the oscillator. An implementation of such a loop is shown in FIG. 3. A rectifier 60 converts the peak amplitude of the output signal of high-impedance amplifier, which is proportional to the amplitude of the AC voltage at node 21 into a proportional DC voltage. An error amplifier 62 compares this DC voltage with a reference value defined by voltage source 64, and outputs a control voltage on its output node 66. That control voltage controls a current sink comprised of transistor 68, resistor 70 and bias voltage source 72 in such a way that the LC tank amplitude (the amplitude of the AC voltage on node 21) remains substantially constant. The magnitude of the current through the current sink around transistor 68 is then inversely responsive to the parallel resistive component of the parallel resonating LC tank. Since the control voltage of node 66 is substantially proportional to the current through the current sink, the control voltage of node 66 can be used to calculate the resistive value of the impedance to be determined.

Figure 4:
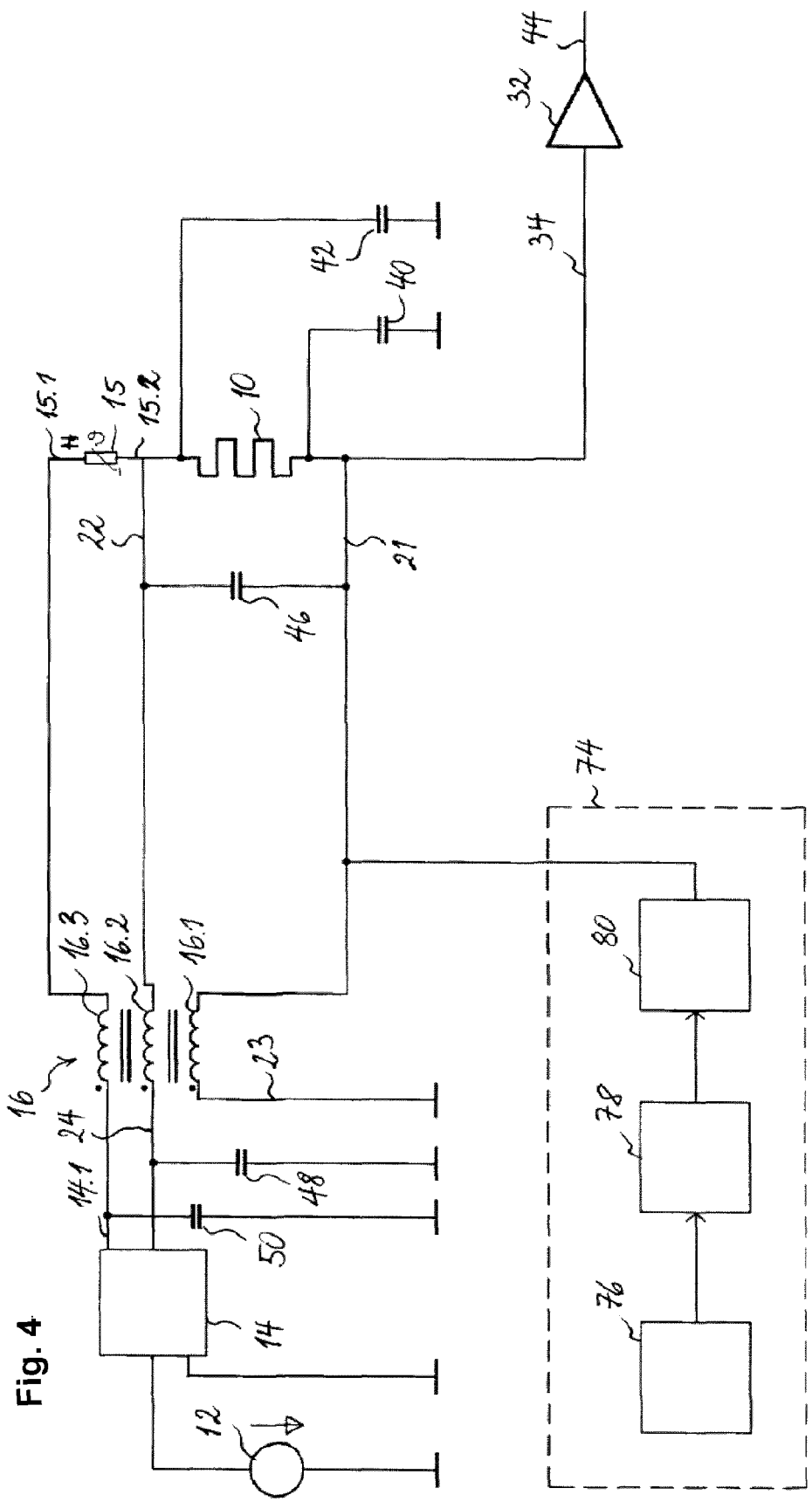
FIG. 4 is a schematic circuit diagram of a second embodiment of a seat heater and capacitive occupancy sensor assembly.

FIG. 4 shows a block schematic diagram of a further embodiment of an assembly of a seat heater and a capacitive occupancy sensor. Elements common to the embodiments of FIG. 1 and FIG. 4, having the same or substantially the same function, have been given the same reference numbers in FIG. 4 as in FIG. 1. As in the previously described embodiments, the seat heater comprises a heating element 10, which is used by the capacitive occupancy sensor as an antenna electrode, which capacitively couples to ground. The capacitance to be measured by the capacitive sensing network is again symbolically represented as capacitors 40 and 42. In the figures described in the following, the reference capacitor and its switch are not shown. Those skilled will appreciate, however, that such reference capacitor or other reference component could be used in the same manner as discussed with respect to FIG. 1.

In the embodiment of FIG. 4, an AC source 74 supplying an AC current into the resonant network, operating at or near the resonance frequency of the resonant network is connected to the first node 21. AC source 74 comprises a microcontroller 76, a controlled oscillator 78 (for example a digital direct synthesizer, commonly called DDS) and a voltage-controlled current source 80. Microcontroller 76 sets the frequency of the DDS 78 by setting the appropriate frequency setting registers of the DDS 78. DDS 78 outputs a sine wave voltage, which the voltage-controlled current source 80 converts to a proportional current. The voltage-controlled current source 80 can e.g. be implemented using an operational transconductance amplifier, such as the OPA861 integrated circuit manufactured by Texas Instruments Inc. Microcontroller 76 sweeps the frequency of the DDS generator through a frequency range around the resonance frequency of the resonant network. By measuring the frequency at which the amplitude of the output signal at node 44 is maximal, or by measuring the frequency at which the phase difference between the output signal at node 44 and the output voltage of DDS 78 or the current output by voltage-controlled current source 80 is substantially zero, the resonance frequency is found. The capacitance to be measured may then be calculated based on the known inductance of the common mode choke and the resonance frequency found. At the resonance frequency, amplitude of the output signal at node 44 is indicative of the real part (i.e. the resistive part) of the impedance to be measured. If the complex impedance of the common mode choke is unknown or too uncertain, one may use a reference capacitor in a manner analogous to that described hereinbefore to eliminate the complex impedance of the common mode choke.

Figure 5:
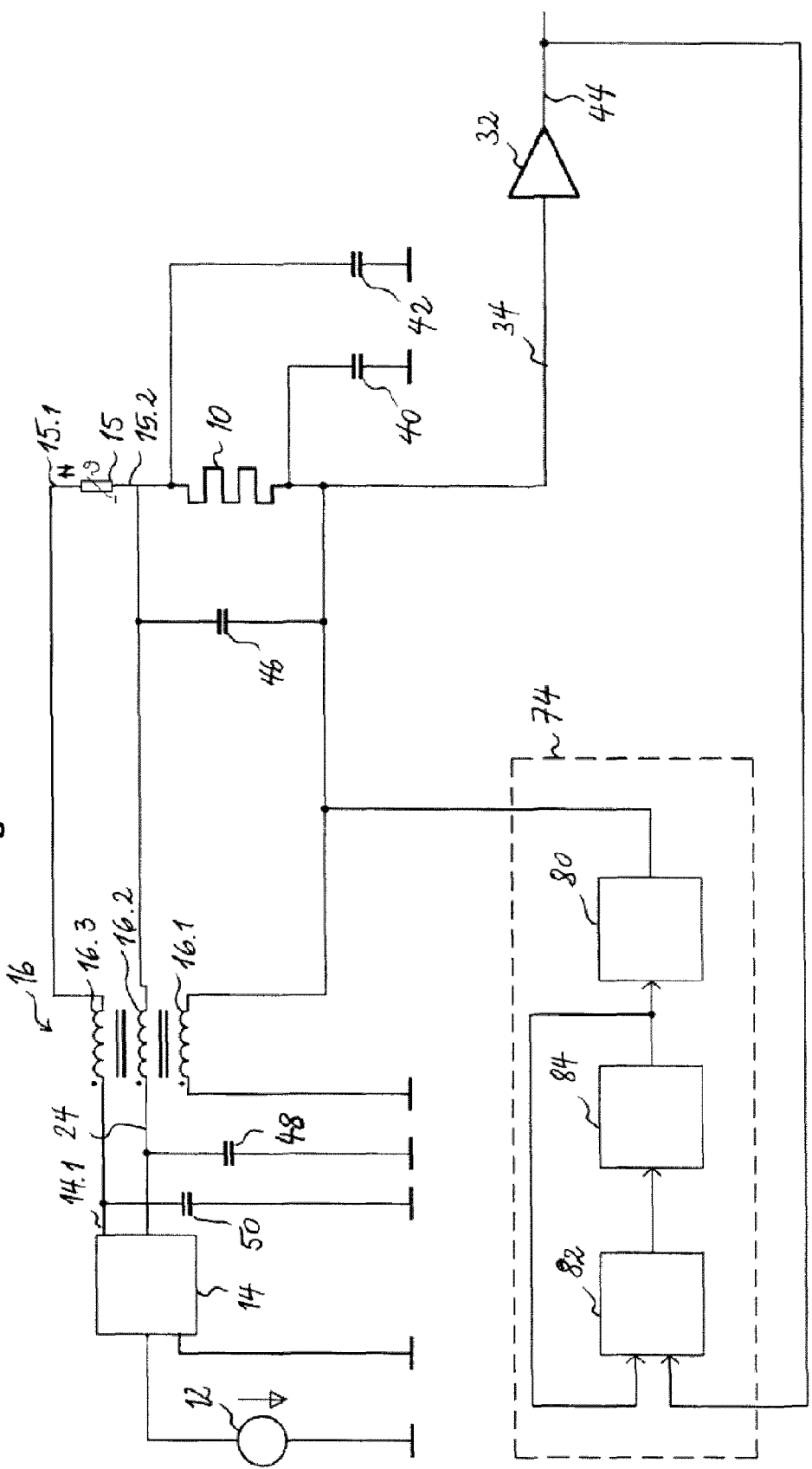
FIG. 5 is a schematic circuit diagram of a variant of the embodiment of FIG. 4.

FIG. 5 shows a variant of the embodiment of FIG. 4. According to this variant, the capacitive sensing network comprises a feedback branch from the output node 44 of the high-impedance amplifier 32 to the AC source. The purpose of the feedback loop is to regulate the phase difference between the output signal on node 44 and the alternative current generated by the AC source to a reference phase difference value of 0°. The phase difference between the output signal on node 44 and the signal generated by the AC source is measured by an edge sensitive phase detector 82, which receives at its inputs the output signal of node 44 and the AC control voltage that controls the voltage-controlled current source 80. Edge sensitive phase detector 82 integrates the phase difference between its input signals and produces an error signal, which is fed to voltage-controlled oscillator 84. The level of the error signal varies as long as there is a phase difference between the input signals of edge sensitive phase detector 82 and causes the voltage-controlled oscillator output an AC control voltage the frequency of which progressively approaches the frequency at which the phase difference finally cancels. This frequency corresponds to the resonance frequency of the resonant network. The edge sensitive phase detector 82 and the voltage-controlled oscillator may e.g. be implemented in the way of the phase comparator II and the VCO parts, respectively, of the 'CMOS micropower phase locked loop' integrated circuit CD4046, manufactured by Texas Instruments Inc. Voltage-controlled current source 80 may e.g. be implemented using an operational transconductance amplifier, such as the OPA861 integrated circuit manufactured by Texas Instruments Inc. The capacitive sensing network of FIG. 5 thus operates at the resonance frequency of the resonant network. Except for transients, the frequency of the output signal is thus equal to the resonance frequency, which depends on the capacitance to be measured. Accordingly, the capacitance to be measured may be determined in the same way as described with respect to FIG. 1.

Figure 6:
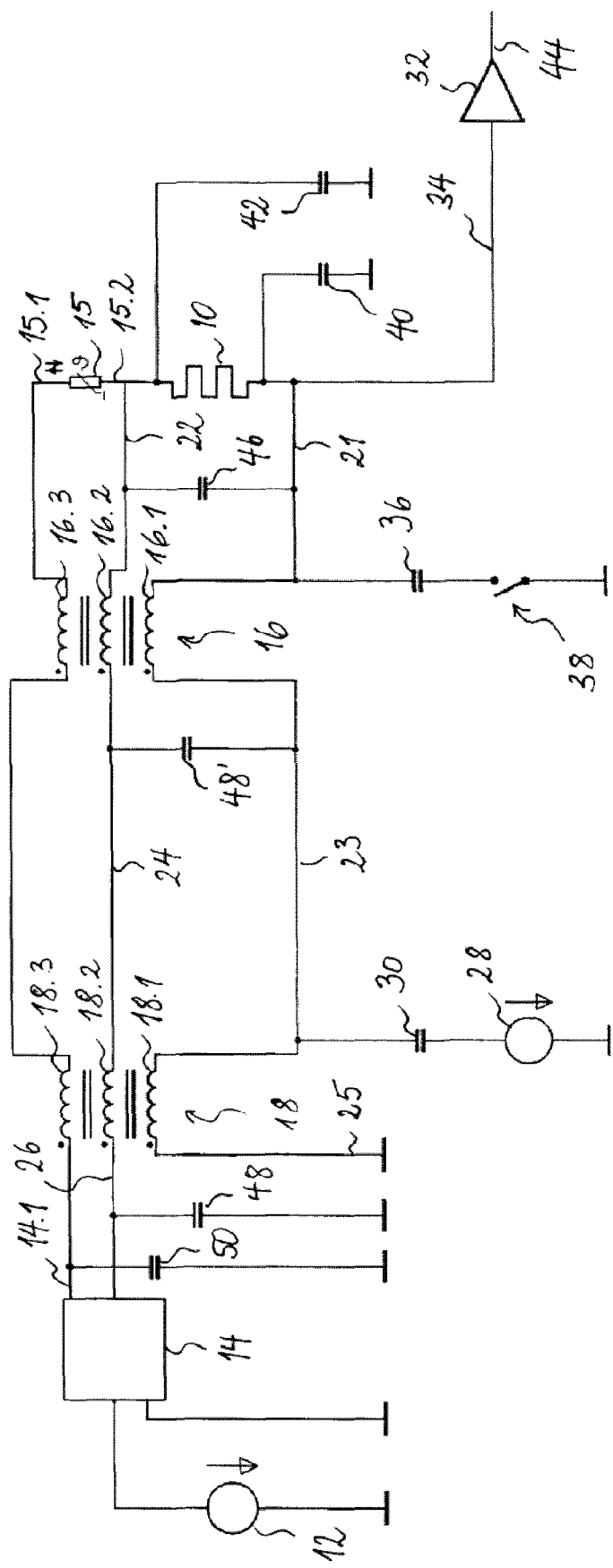
FIG. 6 is a schematic circuit diagram of further embodiment of a seat heater and capacitive occupancy sensor assembly that uses a high-impedance amplifier.

FIG. 6 shows a further embodiment of a combined seat heater and capacitive occupancy sensor. Elements common to the embodiments of FIG. 1 and FIG. 6, having the same or substantially the same function, have been given the same reference numbers in FIG. 6 as in FIG. 1. For sake of conciseness, elements that have already been discussed with reference to FIG. 1 will not be discussed in all detail again. The following description will thus focus on the differences in comparison to the embodiment of FIG. 1.

The heating element 10 is operatively connected to the power source 12 via a first common mode choke 16 and a second common mode choke 18. Each of the common mode chokes 16, 18 includes three windings. A first 16.1 and a second 16.2 winding of the first common mode choke 16 connects the first 21 and the second 22 node to a third 23 and a fourth 24 node, respectively. A first 18.1 and a second 18.2 winding of the second common mode choke 18 connects the third 23 and the fourth 24 node to a fifth 25 and a sixth 26 node, respectively. In FIG. 6, the fifth node 25 corresponds to ground, whereas the sixth node 26 is operatively connected to the high potential terminal of the power source 12 via the temperature controller 14.

Both common mode chokes 16, 18 exhibit low impedance to DC but substantial impedance to AC at the operating frequency of the capacitive occupancy sensor.

When the seat heater is supplied with DC heating current (i.e. when temperature controller 14 is closes the heating circuit), current flows from power source 12 though the temperature controller 14, the node 26 herein designated as sixth node, the second winding 18.2 of common mode choke

18, the node 24 herein designated as fourth node, the second winding 16.2 of common mode choke 16, the node 22 herein designated as second node, the heating element 10, the node 21 herein designated as first node, the first winding 16.1 of common mode choke 16, the node 23 herein designated as third node, the first winding 18.1 of common mode choke 18, to the node 25 herein designated as fifth node, which is tied to ground potential. The heating circuit is completed via the ground connection between the fifth node 25 and power source 12.

The temperature controller 14 is operatively connected via the third winding 18.3 of the common mode choke 18 and the third winding 16.3 of the common mode choke 16 with the first terminal 15.1 of the temperature sensor. The second terminal 15.2 of the temperature sensor is connected to the second node 22 of the heating element 10. The temperature controller 14 functions as described with reference to FIG. 1.

The capacitive sensing network comprises an AC voltage source 28, which is AC-coupled by a coupling capacitor 30 to the third node 23 of the heating network. AC voltage source 28 applies an AC voltage to the third node 23 through coupling capacitor 30. The frequency of the AC voltage (oscillating voltage) may e.g. be chosen to be 1 MHz. The AC voltage applied to the third node 23 causes an AC current to flow to ground across common mode choke 16 and the capacitors 40, 42. The impedance of common mode choke 16 (mainly its inductance) thus forms together with the capacitance to be measured (the sum of the capacitances of capacitors 40, 42) a complex voltage divider dividing the AC voltage on the node first node 21. The divided AC voltage is probed with the high input impedance amplifier 32. High-impedance amplifier 32 provides on its output node 44 an output signal indicative of the AC voltage on the first node. The output signal may be further processed to derive the capacitance to be measured. This may e.g. be achieved by comparing the amplitude and the phase of the output signal with the amplitude and phase of the AC voltage applied to the third node.

Such comparison is preferably achieved by measuring the amplitude and phase of the AC voltage on the third node 23. The capacitance to be measured may then be determined based on the output AC voltage of high-impedance amplifier 32, the measured AC voltage on the third node and the known complex impedance of the common mode choke 16 at the frequency of the applied AC voltage.

Instead of measuring the voltage on the third node 23, the network may be designed in such a way that the amplitude of the AC voltage on the third node 23 takes a known value. According to this option, the capacitance of coupling capacitor 30 and the output impedance of AC voltage source 28 are preferably chosen substantially lower (preferably at least 10 times lower) than the impedance of common mode choke 18 and the impedance to be measured, so that the AC voltage on the third node is essentially equal to the AC voltage output by AC voltage source 28. The capacitance to be measured may then be determined based on the output AC voltage of high-impedance amplifier 32, the known AC voltage on the third node and the known complex impedance of the common mode choke 16 at the frequency of the applied AC voltage.

If ageing, temperature dependence and/or part tolerance could cause the actual complex impedance of the common mode choke 16 to deviate from the theoretical value used for the computation and lead to a measurement error of the unknown capacitance, the computation of the capacitance to be measured may be made independent on the complex impedance of the common mode choke 16 using the reference capacitor 36.

The reference capacitor 36 (having the known capacitance 43 Cref) is connected in series with electronic switch 38. The reference capacitor 36 and switch 38 are both connected between the first node 21 and ground.

The following procedure may e.g. be executed under control of a microcontroller (not shown) of the capacitive sensing network. A first measurement of the complex voltage on output node 44 is made with the reference capacitor being switched off (switch 38 open). This complex voltage is stored (here as $U_{2A}$). A second measurement of the complex output voltage is made with the reference capacitor 36 being switched on (switch 38 closed). During the second measurement, the reference capacitor is connected in parallel to the capacitance to be determined. The complex voltage measured while the reference capacitor is connected is stored (here as $U_{2B}$). The complex voltage of the third node (known or measured) is designated by $U_1$. The complex impedance Zx of the capacitance to be measured may be calculated using:

$$A = \frac{U_{2A}}{U_1 - U_{2A}}$$

$$B = Zref * \frac{U_{2A} - U_{2B}}{U_{2B}}$$

$$Zx = B * (1 + A)$$

where Zref is the complex impedance of the reference capacitor 36.

Obviously, Zref need not necessarily be the complex impedance of a capacitor. Accordingly, one could use any reference component having known complex impedance instead of the reference capacitor 36. The reference component could comprise a plurality of elements, e.g. resistors, inductors and/or capacitors.

Coupling capacitor 48 provides an AC short between the fifth node 25 and the sixth node 26 (via ground). Coupling capacitor 48' provides an AC short between the third node 23 and the fourth node 24. Coupling capacitor 50 provides an AC short between the fifth node 25 and the sensing input 14.1 of the temperature controller 14. A coupling capacitor between node 23 (or node 24) and the node between the windings 18.3 and 16.3 can be added for the case that the coupling coefficient between the windings 18.3 and 18.1 or 18.2 of common mode choke 18 is not sufficiently close to 1.

Capacitor 50 avoids that any AC current coming from the AC signal source 28 is fed back into the DC power source 12 and thereby possibly into the car power network.

Figure 7:
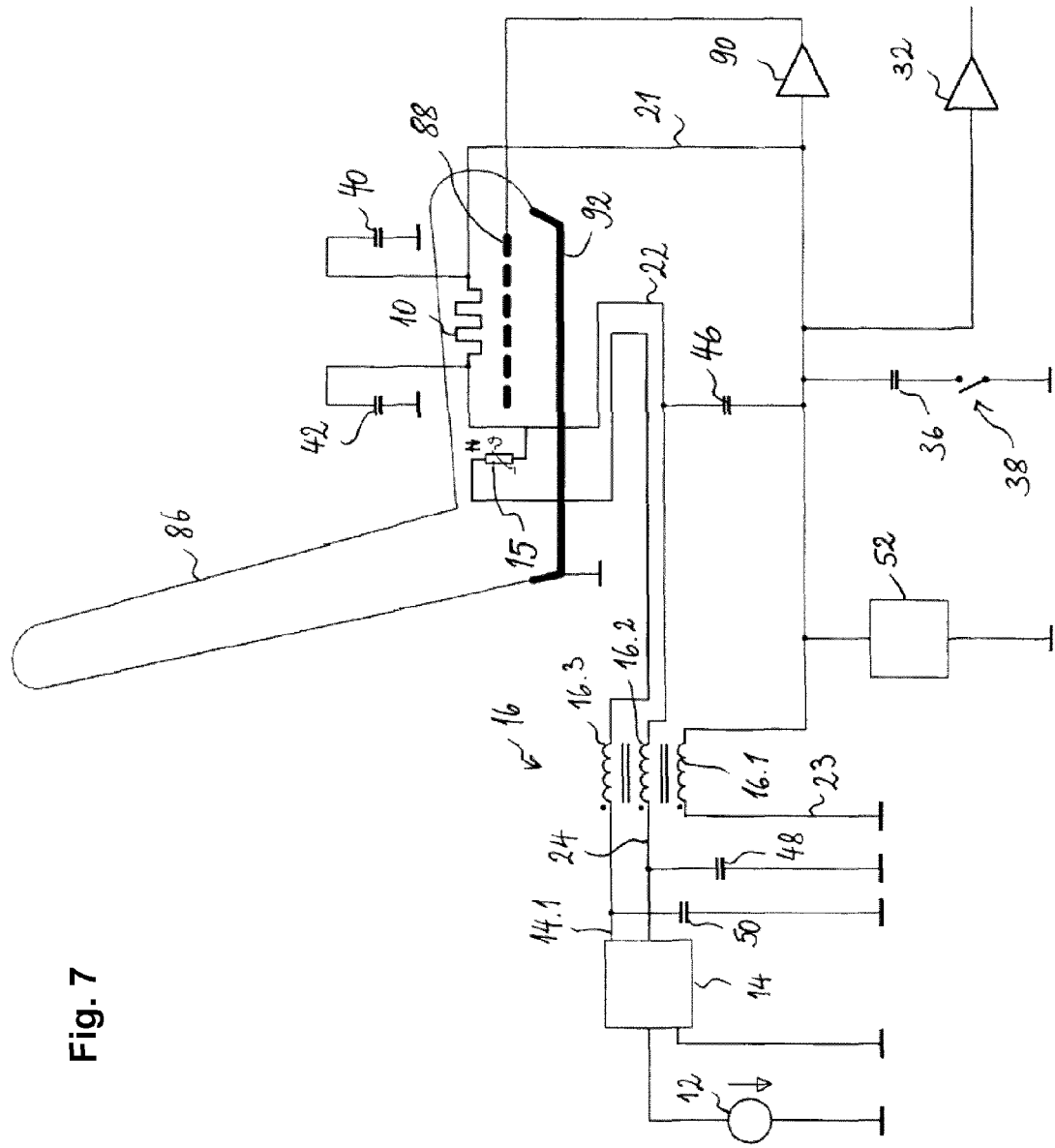
FIG. 7 is a schematic illustration of a vehicle seat equipped with a combined seat heater and capacitive occupancy sensor substantially as in FIG. 1.

FIG. 7 schematically shows a vehicle seat 86 equipped with a combined seat heater and capacitive occupancy sensor, which essentially corresponds to the one shown in FIG. 1, except for the driven shield electrode (or guard electrode) 88 connected to the first node 21 via a voltage follower 90.

Heating element 10 is arranged in seat 86, more specifically underneath the seating surface. In addition to the capacitance or impedance to be measured (illustrated again by capacitors 40 and 42), there is an additional capacitance between the heating element 10 and the seat frame 92. The additional capacitance is in parallel to the capacitance to be measured and may introduce considerable measurement errors, because it is not well known and may vary during the lifetime of the application. In order to suppress the influence of the additional capacitance, a guard electrode 88 is arranged between the seat heater 10 and the seat frame 92. The guard electrode 88 may e.g. be a conductive layer, e.g. a conductive foil or textile, which covers at least the area spanned by the heating element 10. Preferably the guard electrode 88 is larger than the area spanned by the heating element 10 for better shielding. As indicated above, the guard electrode 88 is electrically connected to the first node 21 via voltage follower 90. Voltage follower 90 has high input impedance in order not to disturb the measurement. The voltage follower 90 keeps the voltage on the guard electrode 88 substantially equal to the voltage on the heating element 10. Therefore, when the capacitive measurement is carried out, there is no or only a very small AC voltage difference between the heating element 10 and the guard electrode 88. As a result, substantially no AC current flows between the heating element 10 and the guard electrode 88. The guard electrode 88 being arranged between the heating element 10 and the seat frame 92, substantially no AC current flows between the heating element 10 and the seat frame 92.

The temperature sensor 15 is arranged in the vehicle seat 86 in vicinity of the heating element. Advantageously, the temperature sensor 15, the heating element 10 and the guard electrode are integrated in a single component to facilitate arrangement in the seat.

Figure 8:
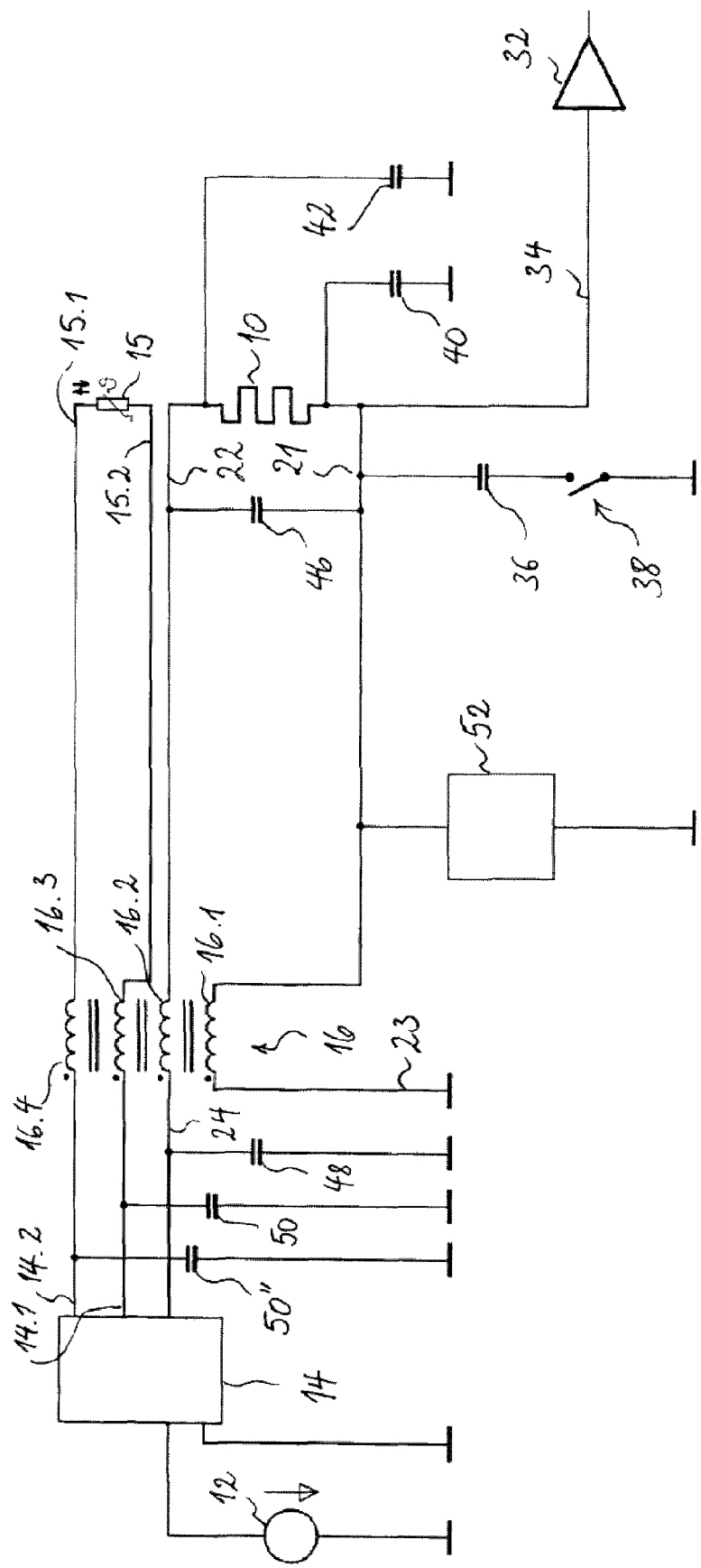
FIG. 8 is a schematic circuit diagram of a variant of the combined seat heater and capacitive occupancy sensor of FIG. 1.

FIG. 8 shows a variant of the combined seat heater and capacitive occupancy sensor of FIG. 1. The variant is essentially identical to the embodiment of FIG. 1 except that the common mode choke 16 comprises four windings 16.1, 16.2, 16.3 and 16.4 and that the temperature sensor is connected in series between the third 16.3 and the fourth 16.4 winding of the common mode choke. The temperature controller 14 also comprises two terminals 14.1, 14.2 for the connection of the temperature sensor 15. Both terminals 14.1 and 14.2 are AC-coupled to ground via coupling capacitors 50 and 50", respectively, in order to ascertain that the terminals of the windings of the common-mode choke 16 that are connected to the temperature controller are all on the same AC potential.

Although the heating circuit and the temperature sensing circuit are in this case separate from one another, the temperature sensor 15 would give rise to an undesired capacitance between heating element 10 and the temperature sensor 15 (or their connection wires), if the temperature sensor were not AC-decoupled from the temperature controller 14.

Figure 9:
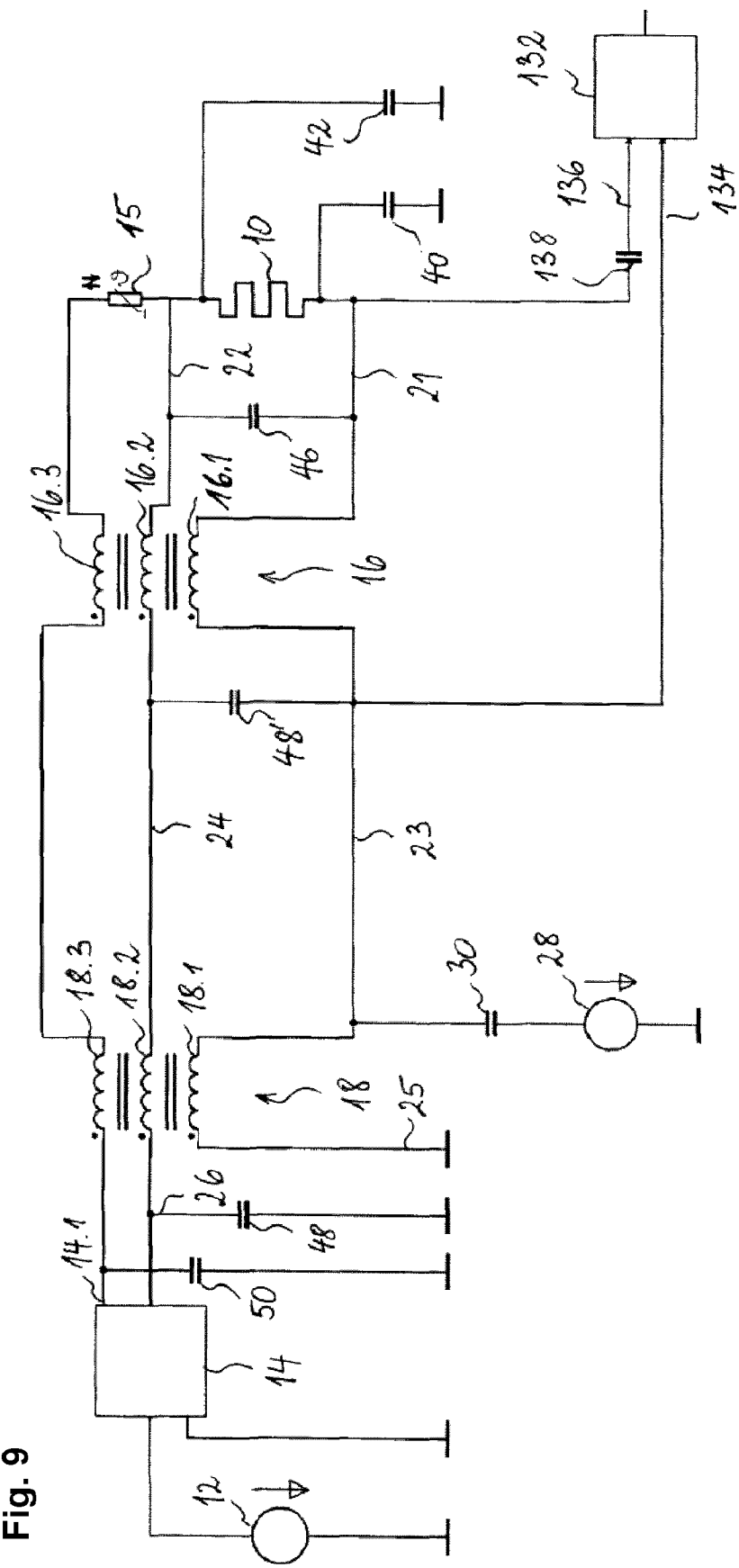
FIG. 9 is a schematic circuit diagram of a first embodiment of a seat heater and capacitive occupancy sensor assembly using a transimpedance amplifier.

Turning now to the embodiments featuring transimpedance amplifiers to measure the capacitance, FIG. 9 shows a block schematic diagram of a combined seat heater and capacitive occupancy sensor according to a first such embodiment.

The embodiment of FIG. 9 is in many respects similar to that of FIG. 6. FIG. 9 thus uses the same reference numbers as FIG. 6 wherever appropriate. Elements that have already been discussed with reference to FIG. 6 will not be discussed again for sake of conciseness. In particular, the heating circuit of the embodiment of FIG. 9 corresponds to the heating circuit of the embodiment of FIG. 6 and will, therefore, not be described again.

The capacitive sensing network of the embodiment of FIG. 9 also comprises an AC voltage source 28, which is AC-coupled by a coupling capacitor 30 to the third node 23 of the heating network, and a transimpedance amplifier 132, the reference input 134 (the above-mentioned first input) of which is connected to the third node and the signal input 136 (the above-mentioned second input) of which is AC-coupled to the first node by coupling capacitor 138.

AC voltage source 28 applies an AC voltage on node 23 through coupling capacitor 30. The frequency of the AC voltage (oscillating voltage) may e.g. be chosen to be 1 MHz. The reference input 134 of transimpedance amplifier 132 is also connected to node 23. Through internal feedback the transimpedance amplifier 132 generates substantially the same AC voltage on its signal input 136 as on its reference input 134. It follows that the transimpedance amplifier 132 applies substantially the same AC voltage to the first node 21 (through coupling capacitor 138) as the AC voltage source 28 applies to the third node 23. Capacitors 40 and 42 symbolically represent the capacitive coupling of the heating element 10 to a grounded electrode (typically the vehicle frame). As the impedance of heating element 10 is very low in comparison with the impedance to be measured (which is the impedance of capacitors 40 and 42), the AC voltage also appears on the second node 22.

Most of the AC current flowing between the heating element 10 and ground flows into (or out of, depending on whether one considers positive or negative current) the signal input 136 of transimpedance amplifier 132. Only a small part of the AC current leaks through the common mode choke 16 because the impedance of the common mode choke 16, defined largely by its inductance, is purposely chosen much higher than the input impedance between the signal input 136 and reference input 134 of the transimpedance amplifier 132. For example, for an input impedance of the transimpedance amplifier 132 of 10Ω and an operating frequency of 1 MHz, the impedance of the common mode choke should preferably amount to at least 100Ω at this frequency, or 16 µH.

It follows that the AC current supplied by transimpedance amplifier 132 is essentially equal to the AC current that flows between the heating element 10 and ground (through capacitors 40 and 42). In other words, transimpedance amplifier 132 converts the AC current that flows between the heating element 10 and ground into an AC voltage, which the transimpedance amplifier 132 outputs on its output node 44. AC output voltage may be further processed to retrieve its amplitude and phase with respect to the AC voltage supplied by AC voltage source 28 in order to derive the capacitance or impedance to be measured.

Figure 10:
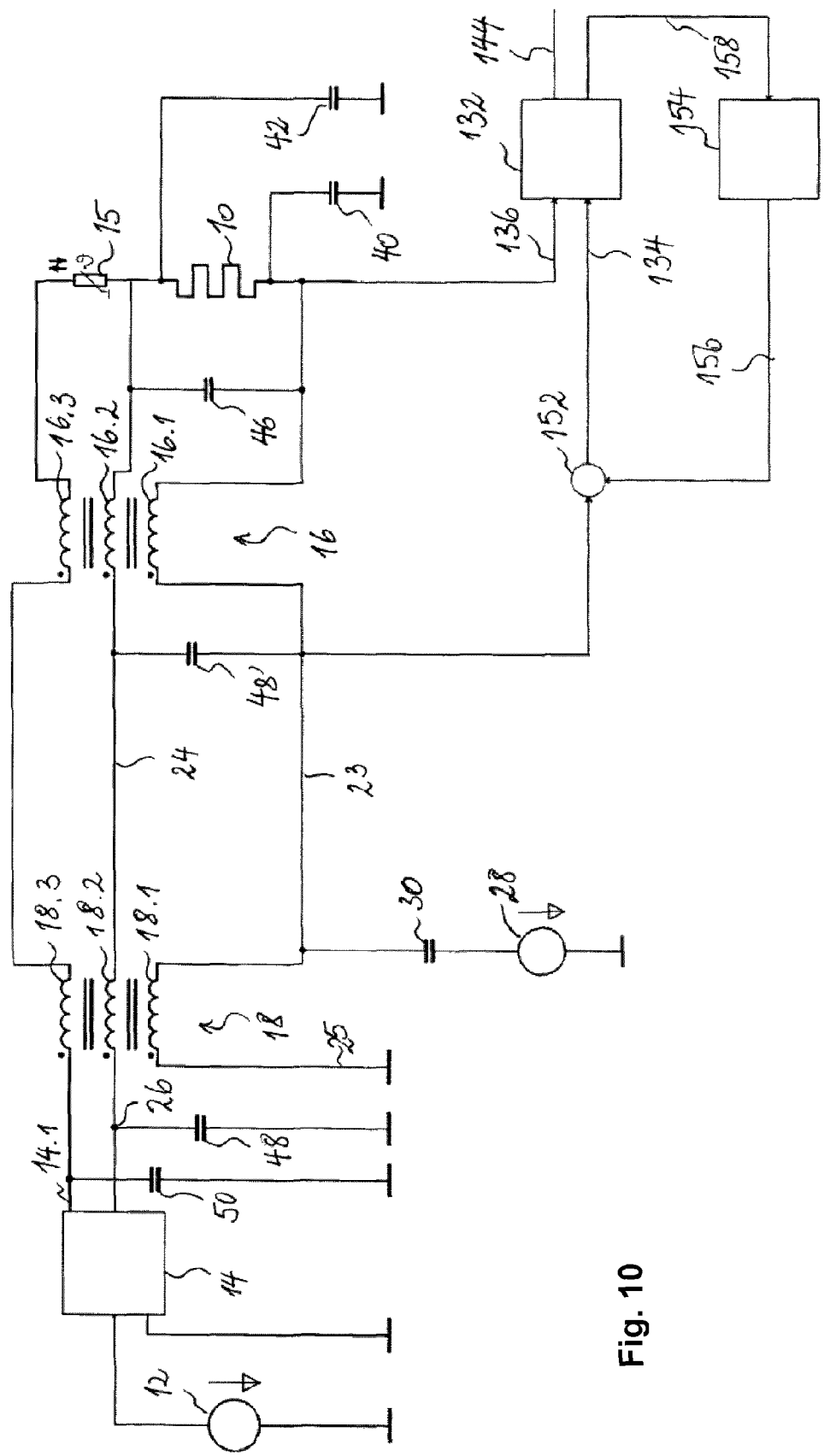
FIG. 10 is a schematic circuit diagram of second embodiment of a combined seat heater and capacitive occupancy sensor using a transimpedance amplifier.

FIG. 10 shows an embodiment of the invention, which slightly differs from the embodiment illustrated in FIG. 9. Elements in common to both embodiments, having the same or substantially the same function, have been given the same reference numbers in FIG. 10 as in FIG. 9 and need not be explained again. In particular, the components of the heater network operate in the same way in both embodiments.

Unlike in the embodiment of FIG. 9, the connection line between the signal input 136 of the transimpedance amplifier 132 and the first node 21 contains no coupling capacitor to prevent direct current from flowing between the signal input 136 of transimpedance amplifier 132 and the heating element 10.

AC voltage source 28 applies an AC voltage on node 23 through coupling capacitor 30. The frequency of the AC voltage (oscillating voltage) may e.g. be 1 MHz. Summing device 152 receives this AC voltage on its input connected to the third node 23 and transfers this AC voltage to the reference input 134 of transimpedance amplifier 132. The other input of summing device 152 is connected to the output 156 of error amplifier 154. As the latter produces a DC signal, the same AC voltage (possibly with a DC offset, which we will consider below) as on the node 23 appears on input 134 of the transimpedance amplifier 132. The transimpedance amplifier 132 attempts to maintain its signal input 136 at the same potential as the reference input 134 through its internal feedback. It follows that the AC voltage applied to reference input 134 is also applied to the heating element 10 by the transimpedance amplifier 132. Due to coupling capacitor 46 and the low impedance of heating element 10 at the frequency of the AC voltage, the AC voltage also appears on the second node 22.

When the seat heater is on, i.e. when the (DC) heating current is flowing, a voltage drop occurs between the first and the third nodes 21, 23 due to the non-zero resistance of the common mode choke 16. This DC voltage drop would normally "upset" the transimpedance amplifier 132, because it would attempt to minimize the potential difference between its inputs 134, 136 and thereby drive its output 144 to one of the supply voltage rails (not shown).

To prevent this from happening, capacitive sensing network comprises a compensating network, which compensates a DC voltage drop between the reference input 134 and the signal input 136 of the transimpedance amplifier 132. The compensating network is configured as a feedback loop comprising the error amplifier 154 and the summing device 152. The transimpedance amplifier 132 comprises a DC output 158, on which it outputs a signal indicative of the DC current that flows into the transimpedance amplifier 132. The error amplifier 154 compares this signal with a reference signal, for example a DC voltage of 0 V, by subtraction. The result of the subtraction operation is added by summing device 152 to the DC voltage that is present on the third node 23. The sum of the error voltage (which is a DC voltage) produced by error amplifier 154 and the voltage of the third node 23 (which contains the AC component applied by the AC signal source 28 and a DC component if the seat heater is on) is used as input signal to the reference input 134 of the transimpedance amplifier 132. The compensating network thus sets the DC output voltage of the transimpedance amplifier 132 equal to the reference voltage of error amplifier 54 and thus keeps the transimpedance amplifier 132 within its operating range, independently of the DC voltage drop across common mode choke 16.

Figure 11:
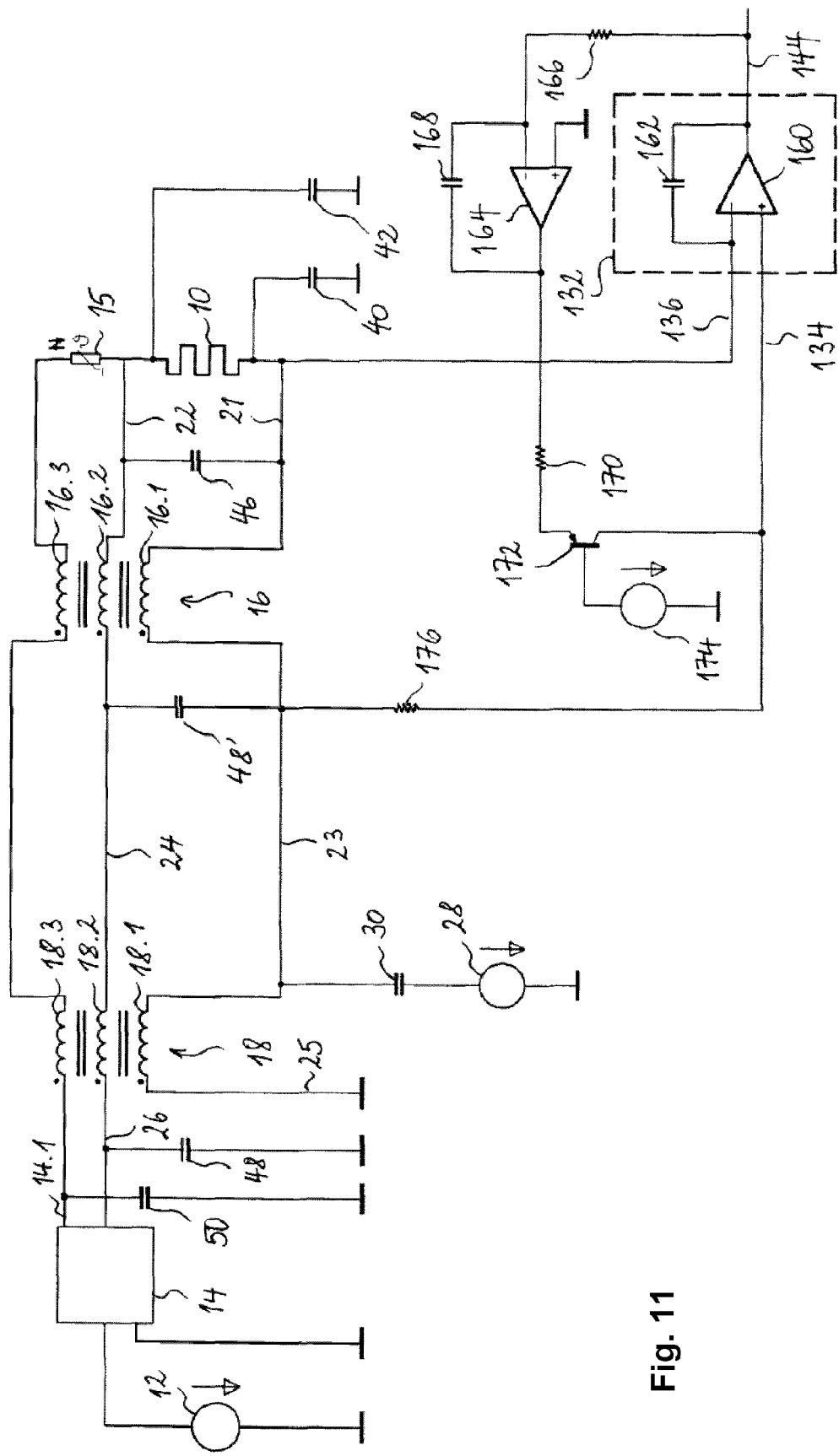
FIG. 11 is a schematic circuit diagram of a first variant of the embodiment of FIG. 10.

FIG. 11 shows a preferred variant of the combined seat heater and capacitive occupancy sensor of FIG. 10. In particular, FIG. 11 illustrates a possible way to implement the transimpedance amplifier 132 and the compensating network introduced in the description of FIG. 10.

Transimpedance amplifier 132 comprises an operational amplifier 160 and a feedback capacitor 162 coupled between the output 144 and the signal input 136 (here: the inverting input) of the operational amplifier 160.

The error amplifier is implemented as an integrator comprising a further operational amplifier 164, resistor 166 and capacitor 168. The inverting input of operational amplifier 164 is connected to the output 144 of operational amplifier 160 via resistor 166. The non-inverting input of operational amplifier 164 is connected to ground, which serves here as the reference voltage for the compensating signal. The voltage on output 144 is indicative of the current (containing an AC component as well as a DC component) flowing into the signal input 136 of transimpedance amplifier 132. The integrator is configured to have low AC gain at the operating frequency of the capacitive measurement. Accordingly, the integrator is only responsive to the DC component of the output signal of the transimpedance amplifier 132. The compensating voltage applied at the output of the integrator thus corresponds to a time-integral of the DC component of the output signal of the transimpedance amplifier 144.

The summing device shown in FIG. 11 is implemented as a summing network, comprising a voltage controlled current source. The voltage controlled current source is comprised of resistor 170, transistor 172, biasing voltage source 174. The output voltage of operational amplifier 164 causes a current flowing through resistor 170, transistor 172, resistor 176, the third node 23 and from there to ground via the first winding 18.1 of common node choke 18. The currents across resistor 170, transistor 172 and resistor 176 are essentially the same because the base current out of transistor 172 and any current into the reference input 134 of amplifier 160 can be neglected in this circuit. The voltage on the reference input 134 of transimpedance amplifier 132 is thus equal to the sum of the voltage on node 23 and the voltage across resistor 176. The voltage across resistor 176 may be calculated as the product of the resistance of resistor 176 and the current through resistor 176 (which, as said above, is substantially equal to the current through resistor 170). The current across resistor 170 is determined as the ratio of the voltage difference between the output voltage of amplifier 164 and the substantially constant emitter voltage of transistor 172, and the resistance of resistor 170. In turn, the voltage on the emitter of transistor 172 is equal to the sum of the constant voltage of bias voltage source 174 and the substantially constant emitter-base voltage drop of transistor 172. Consequently, one may write:

$$U_{134}=U_{23}+R_{176}/R_{170}\cdot(U_{164}-U_{174}-U_{EB}),$$

where $U_{134}$ designates the voltage on the reference input 134 of transimpedance amplifier 132, $U_{164}$ designates the output voltage of amplifier 164, $U_{23}$ the potential of the third node 23, $R_{176}$ the resistance of resistor 176, $R_{170}$ the resistance of resistor 170, $U_{174}$ the voltage applied by the biasing voltage source to the base of transistor 172, and $U_{EB}$ the emitter-base voltage drop of transistor 172.

As the voltage $U_{164}-U_{174}-U_{EB}$ varies only slowly compared to the oscillation frequency of the AC voltage applied by AC voltage source, the AC component of voltage $U_{134}$ is equal to the AC component of $U_{23}$ (in other words, there is only a DC offset between $U_{23}$ and $U_{134}$). It may be noted that the ratio $R_{176}/R_{170}$ is not critical, since any residual potential difference between the third node 23 and the first node 21 will quickly be cancelled via the feedback loop with the error integrator.

Figure 12:
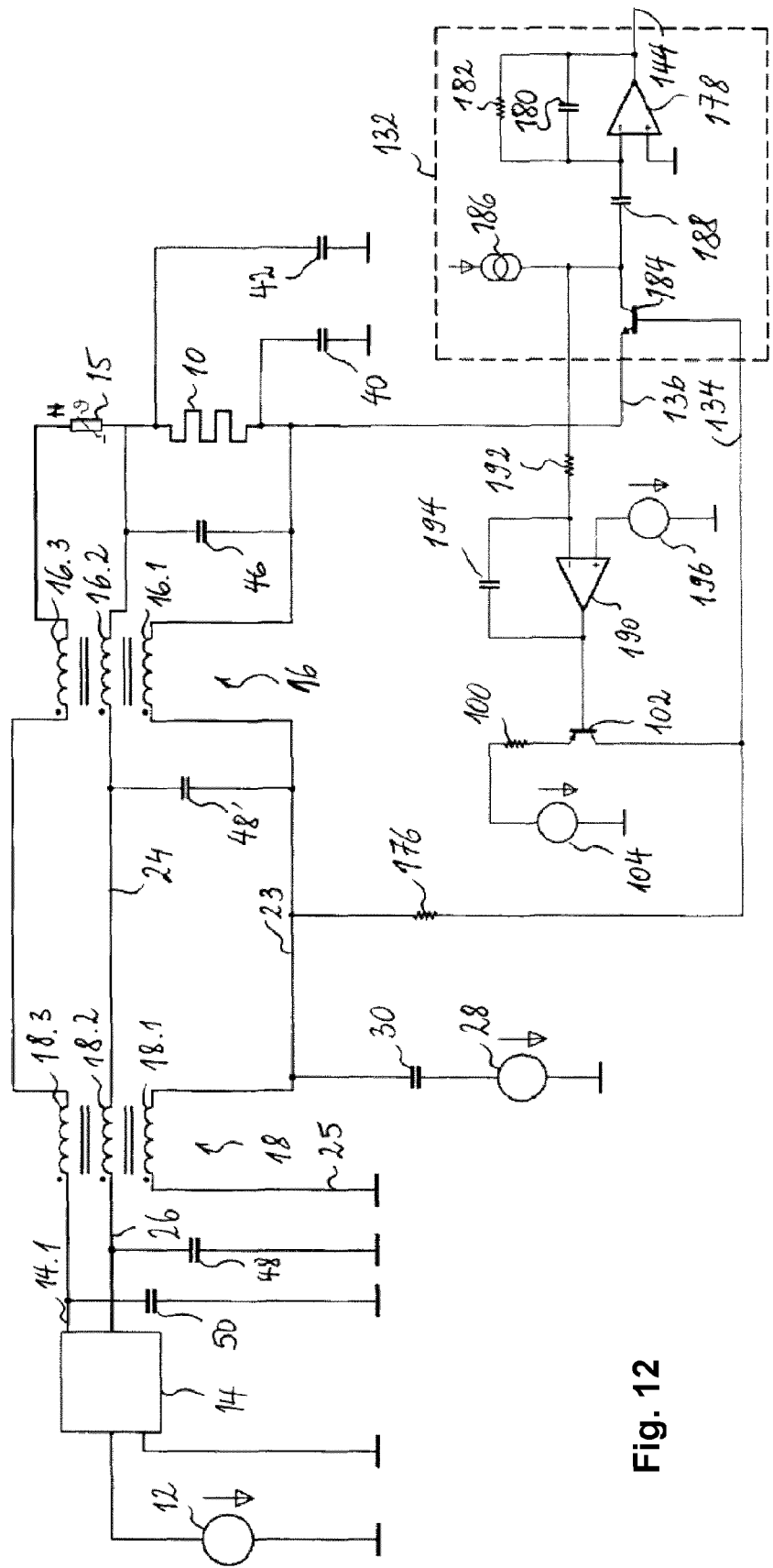
FIG. 12 is a schematic circuit diagram of a second variant of the embodiment of FIG. 10.

FIG. 12 shows a further preferred variant of the combined seat heater and capacitive occupancy sensor of FIG. 10. In particular, FIG. 12 illustrates a further possible way to implement the transimpedance amplifier 132 and the compensating network introduced in the description of FIG. 10.

Transimpedance amplifier 132 comprises an operational amplifier 178, a feedback branch with feedback capacitor 180 electrically in parallel to feedback resistor 182. Transimpedance amplifier 132 further comprises a common base amplifier, which includes transistor 184 and current source 186. The reference input 134 of transimpedance amplifier 132 is formed by the base input of transistor 184. The emitter input of transistor 184 represents the signal input 136 of the transimpedance amplifier 132. The collector of transistor 184 is AC-coupled to the inverting input of operational amplifier 178 via coupling capacitor 188. The advantage of using a common base amplifier in front of the operational amplifier 178 is that the input impedance of the transimpedance amplifier 132 in FIG. 12 is lower than the impedance of transimpedance amplifier 132 of FIG. 11 due to the low input impedance of the common base circuit.

The error amplifier of the embodiment of FIG. 12 is implemented as an integrator, comprising operational amplifier 190, resistor 192, capacitor 194 and biasing voltage source 196. The inverting input of operational amplifier 190 is connected to the collector of transistor 184 via resistor 192. The DC component of the voltage on the collector of transistor 184 is indicative of the DC current flowing into (or out of) the signal input 136 of the transimpedance amplifier 132. The AC component of the voltage on the collector of transistor 184 is shorted by coupling capacitor 188 to the virtual ground voltage at the inverting input of operational amplifier 178.

The error amplifier provides at its output 198 the time-integral of the voltage difference between the collector of transistor 184 and the reference voltage applied by voltage source 196 to the non-inverting input of operational amplifier 190.

A summing network is provided by resistor 176, connected between the third node 23 and the reference input 134 of the transimpedance amplifier 132 and a voltage controlled current source, which comprises resistor 100, transistor 102 and biasing voltage source 104. The voltage controlled current source converts the (DC) output voltage of error amplifier 190 to a current across resistor 100, transistor 102 and resistor 176. This results in a voltage drop across resistor 176. In turn, the voltage on the reference input 134 of transimpedance amplifier 132 may be expressed as the sum of the voltage on the third node 23 and the voltage drop across resistor 176. One may now use the property that the current across resistor 176 is essentially equal to the current across resistor 100 (because one can neglect the currents into the bases of transistors 102 and 184). The voltage $U_E$ at the emitter of transistor 102 is equal to the sum of output voltage of operational amplifier 190 ($U_{198}$) and the emitter-base voltage drop $U_{EB}$ of transistor 102. The voltage drop $U_{100}$ across resistor 100 may thus be expressed as $U_{100}=U_{104}-U_{198}-U_{EB}$, where $U_{104}$ is the bias voltage applied by biasing voltage source 104. It follows that the voltage $U_{134}$ on the reference input of transimpedance amplifier 132 may be expressed as $$U_{134}=U_{23}+R_{176}/R_{100} \cdot (U_{104}-U_{198}-U_{EB}).$$

Biasing voltage source 196 sets the DC bias level of the collector voltage of transistor 184, which bias level is substantially equal to the voltage applied to the non-inverting input of operational amplifier 190 by the biasing voltage source 196 because of the high input impedance of the error amplifier.

As the voltage $U_{104}-U_{198}-U_{EB}$ varies only slowly compared to the oscillation frequency of the AC voltage applied by AC voltage source 28, the AC component of voltage $U_{134}$ is equal to the AC component of $U_{23}$ (in other words, there is only a DC offset between $U_{23}$ and $U_{134}$). The ratio $R_{176}/R_{100}$ is not critical, since the feedback loop with the error integrator and the summing network will maintain the voltage difference between the reference input and the signal input of the transimpedance amplifier substantially equal to the base-emitter voltage drop of transistor 184 when the DC voltage level of the first node 21 changes.

As will be appreciated, in all of the above-described embodiments, the capacitive sensing network may be operated at the same time as or a different time than the seat heater. This is not the case for the combined seat heater and capacitive occupancy sensor illustrated in FIG. 13. The combined seat heater and capacitive occupancy sensor of FIG. 13 cannot simultaneously operate in heating mode and occupancy sensing mode.

Figure 13:
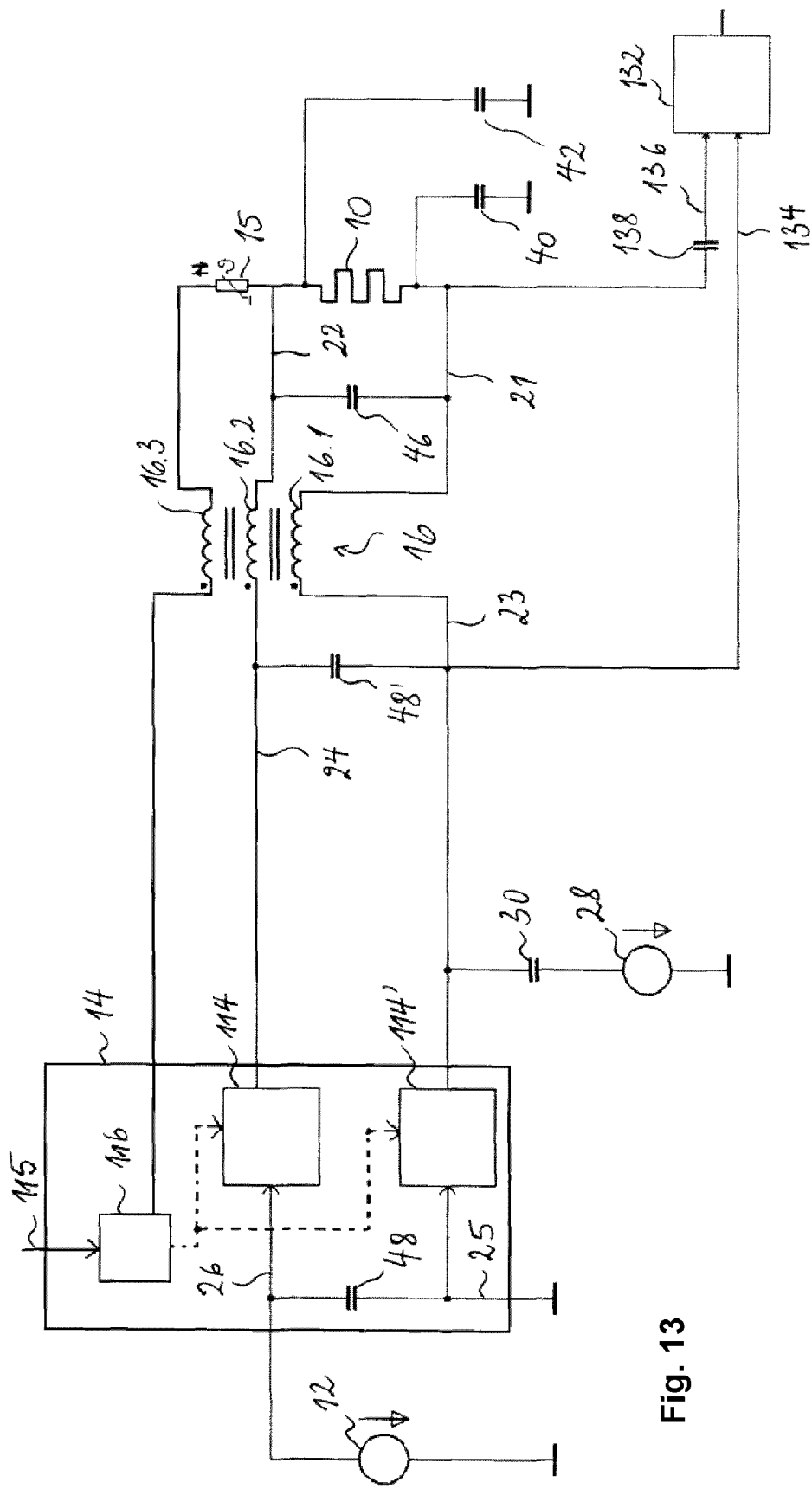
FIG. 13 is a schematic circuit diagram of a third embodiment of a combined seat heater and capacitive occupancy sensor using a transimpedance amplifier.

The embodiment of FIG. 13 differs from the embodiment of FIG. 9 in that the second common mode choke 18 has been removed and in that the temperature controller 14 comprises a first switch 114 between the sixth 26 and the fourth 24 nodes of the heating circuit and a second switch 114' between the fifth 25 and the third 23 nodes of the heating circuit. The temperature controller 14 also includes a switching logic 116 that controls switches 114 and 114' depending on the temperature signal received from the temperature sensor 15 via the third winding 16.3 of the common mode choke 16 and on a control signal 115 from a user control interface (not shown).

When the seat heater is required to heat, both switches 114 and 114' are closed, so that the DC heating current is allowed to flow from the sixth node 26 through switch 114' to the fourth node 24 and the second winding 16.2 of common mode choke 16 through the heating element 10, the first winding 16.1 of common mode choke 16, the third node 23, switch 114' and via the ground connection back to the DC power supply 12. In heating mode, the capacitive measurement is not possible because the third node 23 is short-circuited to ground via switch 114'. Accordingly, AC voltage source 28 is preferably switched off when the system is in heating mode.

When the system is to be used as occupancy sensor, both switches 114 and 114' are open and the AC voltage source is switched on. The capacitive measurement is carried out in the same way as described with reference to FIG. 9.

It should be noted that coupling capacitors 46, 48, 50 fulfill the same purpose in FIGS. 10-13 as in FIG. 9. In the embodiments of FIGS. 9-12, a coupling capacitor between node 23 (or node 24) and the node between the windings 18.3 and 16.3 can be added for the case that the coupling coefficient between the windings 18.3 and 18.1 or 18.2 of common mode choke 18 is not sufficiently close to 1.

In any of the embodiments illustrated in FIG. 9-13, the AC voltage output by the transimpedance amplifier 132 indicates the AC component of the current flowing into the signal input of the transimpedance amplifier 132. It follows that the complex impedance to be measured may be determined as the ratio of the (complex) AC voltage applied by the AC voltage source 28 to the (complex) voltage AC voltage output by the transimpedance amplifier 132 on output node 144. The amplitude and the phase or, alternatively, the in-phase ("imaginary") component and the 90°-phase-shift ("real") component of the AC voltage applied by the AC voltage source 28 being known, it is possible to retrieve the impedance and thus the capacitance to be measured. In a practical application, the occupancy state may thus be determined based on amplitude and phase or, alternatively, from the real and the imaginary components of the AC voltage output by the transimpedance amplifier.

A particularly advantageous way to determine the occupancy state is disclosed in international patent application WO 2008/095939. The method disclosed in this application may be used to determine the real and the imaginary components of the AC voltage output by the transimpedance amplifier 132. In particular, the AC voltage output by the transimpedance amplifier 132 may be fed to a clocked rectifier, synchronized by means of the AC voltage supplied by the AC voltage source as a reference. The low-pass-filtered signals output by the clocked rectifier are then indicative of the real component and the imaginary component of the AC voltage output by the transimpedance amplifier. They may be supplied to an analog-to-digital converter, which forwards them in digital form to a microprocessor.

Figure 14:
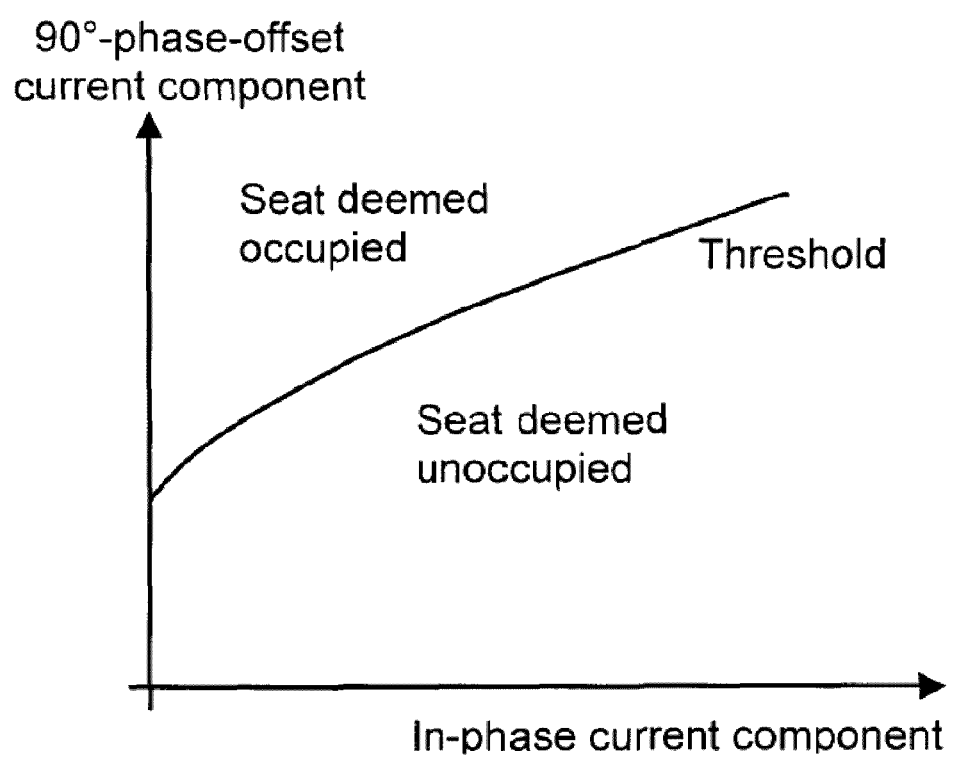
FIG. 14 is a graph representing, as a function of the imaginary current component, the threshold for the real current component, above which a seat is recognized as occupied and below which the seat is deemed unoccupied.

The microprocessor may then determine an occupancy state e.g. by comparing the real component with a threshold, the threshold being dependent upon the imaginary component. FIG. 14 shows a graph representing the threshold for the real (90°-phase-offset) component as a function increasing with the imaginary (in-phase) component. If the real component (indicative of the capacitance to be measured) is found to be below the threshold curve for the determined imaginary component (indicative of a resistive current path from the heating element to ground), the seat is deemed unoccupied by a person; if it is found to be above the threshold for the determined imaginary component, the seat is deemed occupied by a person. Depending on the outcome of the determination of the occupancy state, the microprocessor may issue an output signal communicating the occupancy state to an appliance connected to the combined seat heater and capacitive occupancy sensor, e.g. the control unit of an airbag system or a seat belt warning device. The threshold for the real component being increasing with increasing imaginary component may compensate for a resistive current path from the heating element to ground, e.g. due to a wet seat.

For specific implementations of a clocked rectifier the interested reader is referred to document WO 2008/095939, incorporated herein by reference in its entirety with effect for those jurisdictions, which permit incorporation by reference.

In FIGS. 1 to 12 the temperature controller 14 is connected between the positive terminal of the power source 12 and the heating element 10. Obviously, the heater network would also work if the temperature controller 14 were connected to between the negative terminal of the power source 12 and the heating element 10. In this case, however, some of the capacitive sensing networks described hereinabove have to be adapted to work with a switched negative power supply. The same is true if the AC voltage source 28 and the reference input 134 of the operational amplifier 132 are operatively connected to the fourth node 24 instead of the third node 23. In the light of the above description, the necessary modifications are readily apparent to those skilled in the art and need not be explained in detail.

In all of the above embodiments, an interruption of the heating element 10 can be detected by measuring the DC heating current when the seat heater is switched on. Alternatively, a DC test current which is substantially lower than the heating current can be injected in order to detect an interruption, for example while heating is not desired. A warning can be issued to the car user if the heating current does not flow or if the current that flows lies below a certain threshold.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

In particular, in the embodiments of FIG. 1-7 and FIGS. 9-13, the temperature sensor could be connected to the temperature controller 14 as illustrated in FIG. 8. The common mode chokes with three windings would in this case have to be replaced with common mode chokes having four windings.

It should also be noted that any of the combined seat heater and capacitive occupancy sensor assemblies of FIGS. 2-6 and 8-13 could be integrated into a vehicle seat as shown in FIG. 7 for the special case of the embodiment of FIG. 1. Any of these assemblies could also be implemented with a guard electrode.

The invention claimed is:

1. A seat heater, comprising
   a heating element for dissipating heat when a heating current is caused to flow across said heating element;
   a temperature sensor for providing a temperature signal;
   wherein said seat heater comprises a common mode choke with at least three windings,
   said heating element being connected in series between a first and a second winding of said at least three windings so as to be operatively connectable to a power source via said common mode choke;
   said temperature sensor being connected to a third winding of said at least three windings in such a way that said temperature signal is received via said common mode choke.

2. The seat heater as claimed in claim 1, wherein said temperature sensor comprises a first and a second terminal, said temperature sensor being connected to said third winding with said first terminal and to said heating element with its second terminal.

3. The seat heater as claimed in claim 1, wherein said temperature sensor comprises a first and a second terminal, wherein said at least three windings include a fourth winding, said temperature sensor being connected to said third winding with said first terminal and to said fourth winding with its second terminal.

4. The seat heater as claimed in claim 1, comprising a temperature controller operatively connected to said temperature sensor via said third winding for receiving said temperature signal and to said heating element via said first or said second winding for regulating said heating current depending on said temperature signal received.

5. The seat heater as claimed in claim 1, comprising a support element having said heating element and said temperature sensor arranged thereon.

6. The seat heater as claimed in claim 5, wherein said support element comprises an electrically insulating film.

7. An assembly of a capacitive seat occupancy sensor and a seat heater, said seat heater, comprising
   a heating element for dissipating heat when a heating current is caused to flow across said heating element;
   a temperature sensor for providing a temperature signal;
   wherein said seat heater comprises a common mode choke with at least three windings;
   said heating element being connected in series between a first and a second winding of said at least three windings so as to be operatively connectable to a power source via said common mode choke;
   said temperature sensor being connected to a third winding of said at least three windings in such a way that said temperature signal is received via said common mode choke.

8. The assembly as claimed in claim 7, wherein said capacitive seat occupancy sensor comprises a capacitive sensing network operatively connected to said heating element to apply an oscillating voltage thereto and to derive a capacitive load of said heating element from a current flowing into said heating element in response to an application of said oscillating voltage.

9. The assembly as claimed in claim 8, wherein said capacitive sensing network comprises a means to sustain an oscillating signal in or to drive an oscillating signal into said heating element and a high-impedance amplifier having an input node operatively connected to said heating element to probe said oscillating signal and an output node to provide an output signal indicative of said oscillating signal.

10. The assembly as claimed in claim 9, wherein said capacitive sensing network comprises a reference component having a known complex impedance and a switch to operatively connect said reference component between said heating element and ground.

11. The assembly as claimed in claim 9, wherein said heating element has a capacitance to ground, said common mode choke forming a parallel resonant network with said capacitance.

12. The assembly as claimed in claim 11, wherein said means to sustain an oscillating signal in or to drive an oscillating signal into said heating element comprises
- a negative resistance device to sustain an oscillating signal in said resonant network and to compensate for resistive losses and power extracted from said resonant network, or
- an AC source operatively connected to said heating element to drive an alternative current into said resonant network and a frequency control unit for controlling the frequency of said alternative current.

13. The assembly as claimed in claim 8,
wherein said heating element includes a first node with which said heating element is connected to said first winding, said first winding connecting said first node to a third node,
wherein said heating element includes a second node with which said heating element is connected to said second winding, said second winding connecting said second node to a fourth node,
wherein said capacitive sensing network comprises
an oscillator which is AC-coupled to at least one of said third node and said fourth node to drive said oscillating voltage into said at least one of said third node and said fourth node;
as well as a transimpedance amplifier having a first input AC-coupled to said at least one of said third node and said fourth node to receive said oscillating voltage as an AC component of a reference voltage, a second input operatively connected to at least one of said first node and said second node, said transimpedance amplifier being configured to maintain a voltage on said second input node equal to said reference voltage by driving a current into said second input, said transimpedance amplifier having an output to provide a signal indicative at least of an AC component of said current driven into said second input.

14. The assembly as claimed in claim 10, wherein said reference component comprises a reference capacitor.

15. Vehicle seat, comprising
at least one of a seat heater and an assembly of a capacitive seat occupancy sensor and a seat heater, said seat heater comprising
a heating element for dissipating heat when a heating current is caused to flow across said heating element;
a temperature sensor for providing a temperature signal;
wherein said seat heater comprises a common mode choke with at least three windings;
said heating element being connected in series between a first and a second winding of said at least three windings so as to be operatively connectable to a power source via said common mode choke;
said temperature sensor being connected to a third winding of said at least three windings in such a way that said temperature signal is received via said common mode choke.

16. A vehicle seat as claimed in claim 15, comprising an assembly of a capacitive seat occupancy sensor and a seat heater, wherein assembly comprises a driven shield electrode.

17. A capacitive sensing network configured to apply an oscillating voltage to an antenna electrode and to derive a capacitive load of said antenna electrode from a current flowing into said antenna electrode in response to an application of said oscillating voltage, said capacitive sensing network comprising an interface for connecting said capacitive sensing network to a seat heater including a heating element for dissipating heat when a heating current is caused to flow across said heating element and a temperature sensor for providing a temperature signal, said interface being configured for operating said heating element as said antenna electrode, said capacitive sensing network being characterized in that said interface comprises a common mode choke including a first winding for connecting a first node of said heating element to a first terminal of a power supply, a second winding for connecting a second node of said heating element to a second terminal of said power supply and a third winding for connecting said temperature sensor to a temperature controller.

* * * * *